United States Patent
Nagai

[11] Patent Number: 5,951,610
[45] Date of Patent: Sep. 14, 1999

[54] METHOD OF CALCULATING POSITIONAL RELATIONSHIP OF MOTOR VEHICLE WITH RESPECT TO RUNNING PATH

[75] Inventor: Takaaki Nagai, Wako, Japan

[73] Assignee: Honda Giken Kogyo Kabushiki Kaisha, Tokyo, Japan

[21] Appl. No.: 08/741,060

[22] Filed: Oct. 30, 1996

[30] Foreign Application Priority Data

Oct. 31, 1995 [JP] Japan ................................ 7-283979

[51] Int. Cl.$^6$ ........................................................ G06F 7/70
[52] U.S. Cl. ............................................... 701/23; 701/26
[58] Field of Search ........................ 701/23, 26; 180/167, 180/168, 169

[56] References Cited

U.S. PATENT DOCUMENTS

| | | | |
|---|---|---|---|
| 3,609,678 | 9/1971 | Fayling | 340/92 |
| 3,757,887 | 9/1973 | Moore et al. | 180/98 |
| 4,006,790 | 2/1977 | Kawano et al. | 180/98 |
| 4,714,124 | 12/1987 | Laib | 180/168 |
| 4,908,557 | 3/1990 | Sudare et al. | 318/587 |
| 4,990,841 | 2/1991 | Elder | 318/587 |
| 5,219,036 | 6/1993 | Schwager et al. | 180/168 |
| 5,369,591 | 11/1994 | Broxmeyer . | |
| 5,524,723 | 6/1996 | Gramling et al. | 180/168 |

*Primary Examiner*—William A. Cuchlinski, Jr.
*Assistant Examiner*—Arthur D. Donnelly
*Attorney, Agent, or Firm*—Lyon & Lyon LLP

[57] ABSTRACT

A motor vehicle is automatically steered to run along a running path on a road while detecting magnetic nails that are arranged on the road at spaced intervals along the running path. The motor vehicle has a pair of magnetic nail sensors on respective front and rear portions thereof for detecting lateral deviations of magnetic nails with respect to the motor vehicle at the respective front and rear portions thereof. The magnetic nail sensors are spaced from each other by a distance which is substantially an integral multiple of the interval between adjacent two of the magnetic nails. An azimuth deviation or a lateral deviation of the motor vehicle with respect to the running path is calculated based on lateral deviations of the magnetic nails which are detected substantially simultaneously by the magnetic nail sensors, respectively.

34 Claims, 8 Drawing Sheets

METHOD OF CALCULATING POSITIONAL RELATIONSHIP OF MOTOR VEHICLE WITH RESPECT TO RUNNING PATH

BACKGROUND OF THE INVENTION

1. Field of the Invention

The present invention relates to a method of calculating a positional relationship, with respect to a running path on a road, of a motor vehicle which is automatically steered to run along the running path while detecting magnetic sources or magnetic nails that are arranged on the road at spaced intervals along the running path.

2. Description of the Related Art

There has been proposed in recent years an automatic motor vehicle drive system wherein magnetic nails are embedded in a road at spaced intervals along a running path on the road and detected by a sensor on a motor vehicle to automatically steer the motor vehicle to run along the running path based on magnetic forces produced by the magnetic nails and detected by the sensor.

In the conventional automatic motor vehicle drive system, the sensor for detecting the magnetic nails is mounted in one location on the bottom of the motor vehicle at a front or rear end thereof.

For automatically steering the motor vehicle to run along the running path, the conventional automatic motor vehicle drive system needs to accurately recognize a positional relationship between the motor vehicle and the running path, including a lateral deviation of the motor vehicle from the running path, i.e., a positional displacement in the transverse direction of the motor vehicle with respect to the running path, and an azimuth deviation of the motor vehicle with respect to the running path, i.e., an angle formed between the traveled direction in which the motor vehicle travels and the running path.

Because only one magnetic nail sensor is mounted on the motor vehicle, it is difficult to accurately determine the lateral deviation of the motor vehicle from the running path and the azimuth deviation while the motor vehicle is running. Consequently, it has been customary to rely upon a sensing system other than the magnetic sensor for recognizing the lateral deviation and the azimuth deviation.

For example, a process has been proposed to produce an image of a road ahead of a motor vehicle with a CCD camera mounted on the motor vehicle, and measure the position of the motor vehicle in the transverse direction of the road and the azimuth angle based on the position and direction of white lines coated on the road which are contained in the produced image. One problem with this proposed process is that the detecting capability of the CCD camera may be greatly impaired if the environment of the road is made poor by weather conditions such as rain, snow, etc. If the CCD camera fails to detect the position and direction of white lines on the road, then the lateral deviation and azimuth angle of the motor vehicle cannot accurately be measured.

According to another proposal, a yaw rate sensor is mounted on a motor vehicle to calculate a traveled route along which the motor vehicle has been running. The positional relationship of the motor vehicle with respect to the running path, including a positional displacement and an azimuth deviation of the motor vehicle, is recognized on the basis of the calculated traveled route. However, as the motor vehicle travels an increased distance, detection errors of the yaw rate sensor are accumulated, resulting in difficulty accurately recognizing the positional relationship of the motor vehicle with respect to the running path, including a positional displacement and an azimuth deviation of the motor vehicle.

SUMMARY OF THE INVENTION

It is therefore an object of the present invention to provide a method of accurately calculating a positional relationship, with respect to a running path on a road, of a motor vehicle which is automatically steered to run along the running path while detecting magnetic sources that are arranged on the road, the positional relationship including a lateral deviation of the motor vehicle from the running path and an azimuth deviation of the motor vehicle with respect to the running path, which are required to automatically steer the motor vehicle.

To achieve the above object, there is provided in accordance with a first aspect of the present invention a method of calculating a positional relationship, with respect to a running path on a road, of a motor vehicle which is automatically steered to run along the running path while detecting magnetic sources that are arranged on the road at spaced intervals along the running path, comprising the steps of providing a pair of magnetic source detecting means on respective front and rear portions of the motor vehicle, for detecting lateral deviations of magnetic sources with respect to the motor vehicle at the respective front and rear portions thereof, the magnetic source detecting means being spaced from each other by a distance which is substantially an integral multiple of the interval between adjacent two of the magnetic sources, and calculating an azimuth deviation or a lateral deviation of the motor vehicle with respect to the running path based on lateral deviations of the magnetic sources which are detected substantially simultaneously by the magnetic source detecting means, respectively.

According the first aspect, the two magnetic source detecting means are positioned respectively on the front and rear portions of the motor vehicle at a distance which is substantially an integral multiple of the interval between adjacent two of the magnetic sources, and detect lateral deviations of the magnetic sources which are detected substantially simultaneously with respect to the motor vehicle, i.e., lateral deviations of the motor vehicle at the front and rear portions thereof with respect to the running path. An azimuth deviation or a lateral deviation of the motor vehicle with respect to the running path is calculated based on the lateral deviations detected by the magnetic source detecting means, respectively, on the front and rear portions of the motor vehicle. Therefore, an azimuth deviation or a lateral deviation of the motor vehicle can be determined accurately, making it possible to automatically steer the motor vehicle accurately to run along the running path.

According to the first aspect, specifically, the azimuth deviation of the motor vehicle comprises an angle formed between a traveled direction in which the motor vehicle travels and the running path, and is calculated according to a predetermined equation from the lateral deviations of the magnetic sources which are detected by the magnetic source detecting means, respectively, and either the interval between the magnetic sources which are detected substantially simultaneously by the magnetic source detecting means, respectively, or the distance between the magnetic source detecting means.

The lateral deviation of the motor vehicle comprises a lateral deviation of a center of the motor vehicle with respect to the running path, and is calculated according to a predetermined equation depending on a geometric positional relationship between the center of the motor vehicle and the magnetic source detecting means, from the lateral deviations of the magnetic sources which are detected by the magnetic source detecting means, respectively.

To achieve the above object, there is provided in accordance with a second aspect of the present invention a method of calculating a positional relationship, with respect to a running path on a road, of a motor vehicle which is automatically steered to run along the running path while detecting magnetic sources that are arranged on the road at spaced intervals along the running path, comprising the steps of providing a pair of magnetic source detecting means on respective front and rear portions of the motor vehicle, for detecting lateral deviations of magnetic sources with respect to the motor vehicle at the respective front and rear portions thereof, providing timer means for recognizing times at which magnetic sources are detected respectively by the magnetic source detecting means, and calculating an azimuth deviation or a lateral deviation of the motor vehicle with respect to the running path based on lateral deviations of the magnetic sources which are detected by the magnetic source detecting means, respectively, and a chronological relationship between the times at which the magnetic sources are detected by the magnetic source detecting means, respectively.

According to the second aspect, the distance between the magnetic source detecting means positioned respectively on the front and rear portions of the motor vehicle is not limited to an integral multiple of the interval between adjacent two of the magnetic sources. Therefore, lateral deviations of the magnetic sources may be detected at different times by the respective magnetic source detecting means. In such a case, the times at which the magnetic sources are detected by the respective magnetic source detecting means are recognized by the timer means, and the chronological relationship between the recognized times is taken into consideration for determining an azimuth deviation or a lateral deviation of the motor vehicle with respect to the running path based on the lateral deviations of the magnetic sources which are detected by the magnetic source detecting means, respectively, and the chronological relationship between. Since an azimuth deviation or a lateral deviation of the motor vehicle with respect to the running path is calculated based on the lateral deviations detected by the magnetic source detecting means, respectively, on the front and rear portions of the motor vehicle, an azimuth deviation or a lateral deviation of the motor vehicle can be determined accurately. In the second aspect, therefore, while the distance between the magnetic source detecting means positioned respectively on the front and rear portions of the motor vehicle is not limited to an integral multiple of the interval between adjacent two of the magnetic sources, it is possible to determine an azimuth deviation or a lateral deviation of the motor vehicle accurately.

According to the second aspect, specifically, the azimuth deviation of the motor vehicle comprises an angle formed between a traveled direction in which the motor vehicle travels and the running path, and is calculated, if the times at which the magnetic sources are detected respectively by the magnetic source detecting means are substantially the same as each other, according to a predetermined equation from the lateral deviations of the magnetic sources which are detected by the magnetic source detecting means, respectively, and either the interval between the magnetic sources which are detected substantially simultaneously by the magnetic source detecting means, respectively, or the distance between the magnetic source detecting means.

The lateral deviation of the motor vehicle comprises a lateral deviation of a center of the motor vehicle with respect to the running path, and is calculated, if the times at which the magnetic sources are detected respectively by the magnetic source detecting means are substantially the same as each other, according to a predetermined equation depending on a geometric positional relationship between the center of the motor vehicle and the magnetic source detecting means, from the lateral deviations of the magnetic sources which are detected by the magnetic source detecting means, respectively.

The azimuth deviation of the motor vehicle comprises an angle formed between a traveled direction in which the motor vehicle travels and the running path, and is calculated, if the times at which the magnetic sources are detected respectively by the magnetic source detecting means are different from each other, according to a predetermined equation from the interval between the magnetic sources which are detected successively by the magnetic source detecting means, determined depending on whether the time at which the magnetic source detecting means on the front portion of the motor vehicle detects a magnetic source is earlier or later than the time at which the magnetic source detecting means on the rear portion of the motor vehicle detects a magnetic source, and the lateral deviations of the magnetic sources which are detected by the magnetic source detecting means, respectively.

If the times at which the magnetic sources are detected respectively by the magnetic source detecting means are different from each other, the lateral deviation of the motor vehicle comprises a lateral deviation of a center of the motor vehicle with respect to the running path, and is calculated according to a predetermined equation depending on a geometric positional relationship between the center of the motor vehicle and the magnetic source detecting means and the chronological relationship between the times at which the magnetic sources are detected by the magnetic source detecting means, respectively, from the lateral deviations of the magnetic sources which are detected by the magnetic source detecting means, respectively, the interval between the magnetic sources which are detected successively by the magnetic source detecting means, respectively, and the azimuth deviation.

According to a third aspect of the present invention, the above object can be accomplished by a method of calculating a positional relationship, with respect to a running path on a road, of a motor vehicle which is automatically steered to run along the running path while detecting magnetic sources that are arranged on the road at spaced intervals along the running path, comprising the steps of providing a pair of magnetic source detecting means on respective front and rear portions of the motor vehicle, for detecting lateral deviations of magnetic sources with respect to the motor vehicle at the respective front and rear portions thereof, providing distance detecting means for detecting a traveled distance of the motor vehicle when magnetic sources are detected respectively by the magnetic source detecting means, recognizing respective positions of the magnetic source detecting means along the traveled distance on the running path when the magnetic sources are detected by the magnetic source detecting means, based on the traveled distance and positions of the magnetic sources with respect to the motor vehicle, and calculating an azimuth deviation or a lateral deviation of the motor vehicle with respect to the running path based on lateral deviations of the magnetic sources which are detected by the magnetic source detecting means, respectively, and a magnitude relationship of a distance difference between the positions on the running path of the respective magnetic source detecting means when the magnetic sources are detected by the magnetic source detecting means to the distance between the magnetic source detecting means.

According to the third aspect, as with the second aspect, the distance between the magnetic source detecting means positioned respectively on the front and rear portions of the motor vehicle is not limited to an integral multiple of the interval between adjacent two of the magnetic sources, and lateral deviations of the magnetic sources may be detected at different times by the respective magnetic source detecting means. Specifically, if the distance difference between the positions on the running path of the magnetic source detecting means when the magnetic sources are detected by the magnetic source detecting means is substantially equal to the distance between the magnetic source detecting means, then lateral deviations of the magnetic sources are detected substantially simultaneously by the respective magnetic source detecting means. If the distance difference is greater than the distance between the magnetic source detecting means, then the rear magnetic source detecting means detects a magnetic source earlier than the front magnetic source detecting means detects a magnetic source. If the distance difference is smaller than the distance between the magnetic source detecting means, then the rear magnetic source detecting means detects a magnetic source later than the front magnetic source detecting means detects a magnetic source. Therefore, the magnitude relationship of the distance difference to the distance between the magnetic source detecting means is representative of the chronological relationship between the times at which the magnetic sources are detected by the magnetic source detecting means. By taking into account the magnitude relationship of the distance difference to the distance between the magnetic source detecting means, it is possible to determine an azimuth deviation or a lateral deviation of the motor vehicle with respect to the running path accurately based on the magnitude relationship as well as the lateral deviations of the magnetic sources which are detected by the magnetic source detecting means, respectively. Inasmuch as an azimuth deviation or a lateral deviation of the motor vehicle with respect to the running path is calculated based on the lateral deviations detected by the magnetic source detecting means, respectively, on the front and rear portions of the motor vehicle, an azimuth deviation or a lateral deviation of the motor vehicle can be determined accurately. In the third aspect, therefore, as with the second aspect, while the distance between the magnetic source detecting means positioned respectively on the front and rear portions of the motor vehicle is not limited to an integral multiple of the interval between adjacent two of the magnetic sources, it is possible to determine an azimuth deviation or a lateral deviation of the motor vehicle accurately.

According to the third aspect, specifically, the azimuth deviation of the motor vehicle comprises an angle formed between a traveled direction in which the motor vehicle travels and the running path, and is calculated, if the distance difference is substantially equal to the distance between the magnetic source detecting means, according to a predetermined equation from the lateral deviations of the magnetic sources which are detected by the magnetic source detecting means, respectively, and either the interval between the magnetic sources which are detected by the magnetic source detecting means, respectively, or the distance between the magnetic source detecting means.

The lateral deviation of the motor vehicle comprises a lateral deviation of a center of the motor vehicle with respect to the running path, and is calculated, if the distance difference is substantially equal to the distance between the magnetic source detecting means, according to a predetermined equation depending on a geometric positional relationship between the center of the motor vehicle and the magnetic source detecting means, from the lateral deviations of the magnetic sources which are detected by the magnetic source detecting means, respectively.

The azimuth deviation of the motor vehicle comprises an angle formed between a traveled direction in which the motor vehicle travels and the running path, and is calculated, if the distance difference is different from the distance between the magnetic source detecting means, according to a predetermined equation from the interval between the magnetic sources which are detected successively by the magnetic source detecting means, determined depending on whether the distance difference is greater or smaller than the distance between the magnetic source detecting means, and the lateral deviations of the magnetic sources which are detected by the magnetic source detecting means, respectively.

The lateral deviation of the motor vehicle comprises a lateral deviation of a center of the motor vehicle with respect to the running path, and is calculated, if the distance difference is different from the distance between the magnetic source detecting means, according to a predetermined equation depending on a geometric positional relationship between the center of the motor vehicle and the magnetic source detecting means and the magnitude relationship of the distance difference to the distance between the magnetic source detecting means, from the lateral deviations of the magnetic sources which are detected by the magnetic source detecting means, respectively, the interval between the magnetic sources which are detected successively by the magnetic source detecting means, respectively, and the azimuth deviation.

According to a fourth aspect of the present invention, the above object can be accomplished by a method of calculating a positional relationship, with respect to a running path on a road, of a motor vehicle which is automatically steered to run along the running path while detecting magnetic sources that are arranged on the road at spaced intervals along the running path, comprising the steps of providing a pair of magnetic source detecting means on respective front and rear portions of the motor vehicle, for detecting lateral deviations of magnetic sources with respect to the motor vehicle at the respective front and rear portions thereof, providing distance detecting means for detecting a traveled distance of the motor vehicle when magnetic sources are detected respectively by the magnetic source detecting means, recognizing respective positions of the magnetic source detecting means along the traveled distance on the running path when the magnetic sources are detected by the magnetic source detecting means, based on the traveled distance and positions of the magnetic sources with respect to the motor vehicle, and calculating an azimuth deviation or a lateral deviation of the motor vehicle with respect to the running path based on lateral deviations of the magnetic sources which are detected by the magnetic source detecting means, respectively, and a distance difference between the positions on the running path of the respective magnetic source detecting means when the magnetic sources are detected by the magnetic source detecting means.

According to the fourth aspect, even if the magnetic sources are spaced at uneven intervals, it is possible to calculate an azimuth deviation or a lateral deviation of the motor vehicle with respect to the running path. In such a case, an azimuth deviation or a lateral deviation of the motor vehicle with respect to the running path can be determined with high precision based on the lateral deviations of the magnetic sources which are detected by the magnetic source detecting means, respectively, and the distance difference between the positions on the running path of the respective magnetic source detecting means when the magnetic sources are detected by the magnetic source detecting means.

Specifically, the azimuth deviation of the motor vehicle comprises an angle formed between a traveled direction in which the motor vehicle travels and the running path, and is calculated according to a predetermined equation from the lateral deviations of the magnetic sources which are detected by the magnetic source detecting means, respectively, and the distance difference. The predetermined equation does not depend upon a chronological relationship between the times at which the magnetic sources are detected by the magnetic source detecting means.

The lateral deviation of the motor vehicle comprises a lateral deviation of a center of the motor vehicle with respect to the running path, and is calculated, if the distance difference is substantially equal to the distance between the magnetic source detecting means, according to a predetermined equation depending on a geometric positional relationship between the center of the motor vehicle and the magnetic source detecting means, from the lateral deviations of the magnetic sources which are detected by the magnetic source detecting means, respectively.

The lateral deviation of the motor vehicle comprises a lateral deviation of a center of the motor vehicle with respect to the running path, and is calculated, if the distance difference is different from the distance between the magnetic source detecting means, according to a predetermined equation depending on a geometric positional relationship between the center of the motor vehicle and the magnetic source detecting means and a magnitude relationship of the distance difference to the distance between the magnetic source detecting means, from the lateral deviations of the magnetic sources which are detected by the magnetic source detecting means, respectively, and the distance difference.

In the first through fourth aspects, if one of the magnetic source detecting means fails to detect a magnetic source due to a snaking motion of the motor vehicle or a malfunction of the magnetic source detecting means, it is not possible to calculate an azimuth deviation or a lateral deviation of the motor vehicle with respect to the running path.

According to the first through fourth aspects, if one of the magnetic source detecting means fails to detect a magnetic source, the azimuth deviation or the lateral deviation of the motor vehicle with respect to the running path is calculated based on lateral deviations of respective two magnetic sources which are detected successively by the other of the magnetic source detecting means.

Consequently, even when one of the magnetic source detecting means fails to detect a magnetic source, insofar as the other of the magnetic source detecting means is capable of detecting a magnetic source, it is possible to determine the azimuth deviation or the lateral deviation of the motor vehicle with respect to the running path based on the lateral deviations of respective two magnetic sources which are detected successively by the other of the magnetic source detecting means as the motor vehicle progresses.

Specifically, an angle between a traveled direction in which the motor vehicle travels and the running path is calculated according to a predetermined equation from the lateral deviations of respective two magnetic sources which are detected successively by the other of the magnetic source detecting means, and a traveled distance of the motor vehicle between times at which the respective two magnetic sources are detected successively, and is determined as the azimuth angle. In the first and second aspects, the traveled distance of the motor vehicle is detected by distance detecting means on the motor vehicle.

The lateral deviation of the motor vehicle comprises a lateral deviation of a center of the motor vehicle with respect to the running path, and is calculated according to a predetermined equation depending on a geometric positional relationship between the center of the motor vehicle and the other of the magnetic source detecting means from the azimuth angle and one of the lateral deviations of the respective two magnetic sources.

Alternatively, a lateral deviation of a center of the motor vehicle with respect to the running path is calculated according to a predetermined equation a geometric positional relationship between the center of the motor vehicle and the other of the magnetic source detecting means from the lateral deviations of respective two magnetic sources which are detected successively by the other of the magnetic source detecting means, and a traveled distance of the motor vehicle between times at which the respective two magnetic sources are detected successively, and is determined as the lateral deviation of the motor vehicle. In the first and second aspects, the traveled distance of the motor vehicle is detected by distance detecting means on the motor vehicle.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
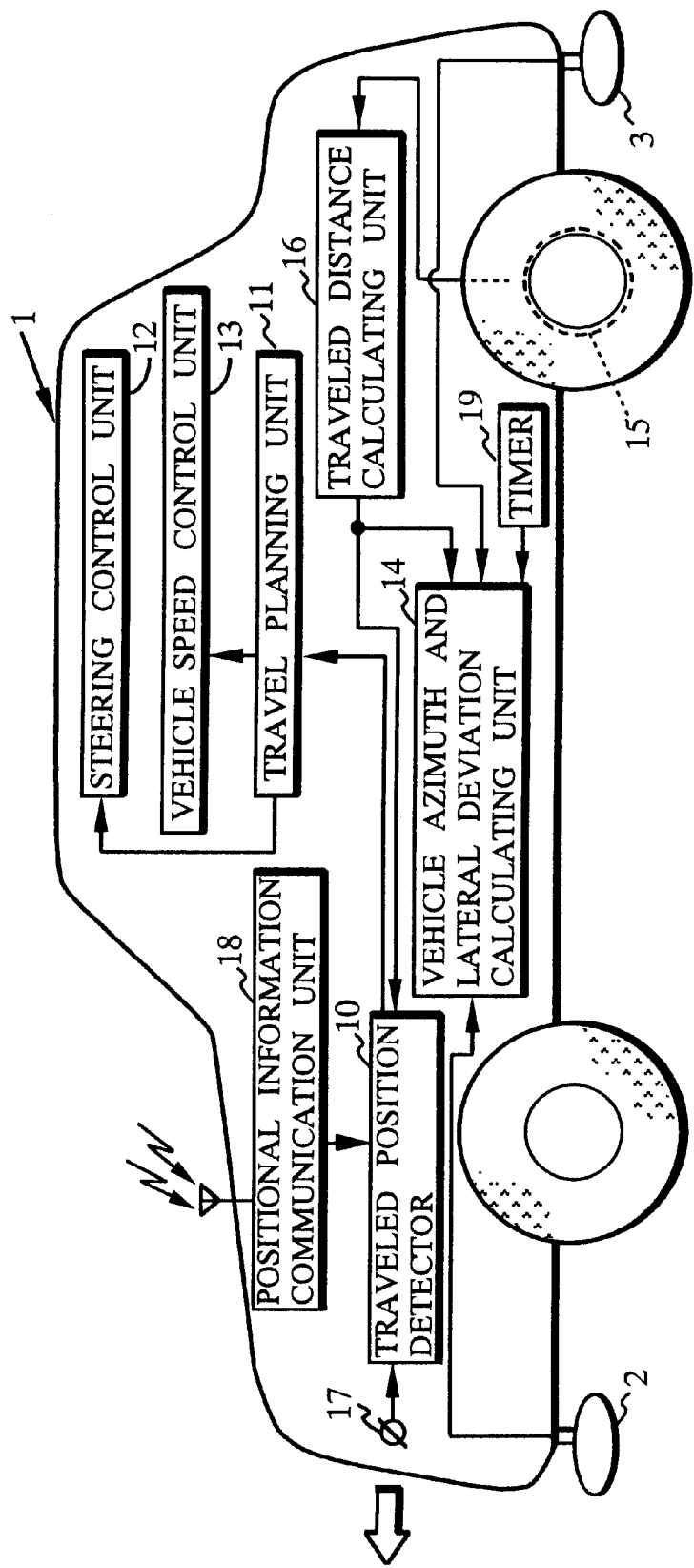
FIG. 1 is a block diagram of a system configuration of an automatically driven motor vehicle to which the present invention is applied.

FIG. 1 shows in block form a system configuration of an automatically driven motor vehicle to which the present invention is applied.

The automatically driven motor vehicle, designated by the reference numeral 1 in FIG. 1, is automatically driven along a running path on a road while detecting magnetic rails (magnetic sources) which are embedded in the road at spaced intervals along the running path which may be positioned at the center of a lane of the road.

The automatically driven motor vehicle 1 has a traveled position detector 10, a travel planning unit 11, a steering control unit 12, a vehicle speed control unit 13, and a vehicle azimuth and lateral deviation calculating unit 14 which are implemented by a microcomputer or the like. Magnetic nail sensors 2, 3 (magnetic source detecting means) are mounted on respective lower surfaces of front and rear ends of the motor vehicle 1. The motor vehicle 1 also has a wheel pulse sensor 15 for outputting a pulse each time a wheel (a rear wheel in FIG. 1) makes a certain number of revolutions.

The motor vehicle 1 also has a traveled distance calculating unit (distance detecting means) 16 for counting pulses outputted from the wheel pulse sensor 15, a gyrosensor 17 for detecting an angular velocity of the motor vehicle 1, and a positional information communication unit 18 for receiving positional information such as a traveled zone of the motor vehicle 1 through radio communications with a leakage coaxial cable disposed outside of the motor vehicle 1. The traveled position detector 10 determines a traveled position to which the motor vehicle 1 has traveled on the running path, based on a traveled distance calculated by the traveled distance calculating unit 16, an angular velocity detected by the gyrosensor 17, and received information from the positional information communication unit 18.

The travel planning unit 11 determines an optimum vehicle speed and direction of travel for running the motor vehicle 1 along the running path, based on the traveled position information of the motor vehicle 1 which is given from the traveled position detector 10, and gives the determined vehicle speed and direction of travel to the steering control unit 12 and the vehicle speed control unit 13.

When one of the magnetic nails is positioned below each of the magnetic nail sensors 2, 3, each of the magnetic nail sensors 2, 3 outputs a signal representing a lateral deviation (in the transverse direction of the motor vehicle 1) of the magnetic nail with respect to the motor vehicle 1, the lateral deviation including information about the direction of the deviation.

The vehicle azimuth and lateral deviation calculating unit 14 calculates an azimuth deviation and a lateral deviation of the motor vehicle 1 from the running path, as described later on, based on lateral deviations of magnetic nails detected by the magnetic nail sensors 2, 3, a traveled distance of the motor vehicle 1 determined by the traveled distance calculating unit 16, and time data (a clock signal) given from a timer (timer means) 19, and gives the calculated azimuth deviation and lateral deviation to the steering control unit 12. The vehicle azimuth and lateral deviation calculating unit 14 stores the lateral deviations of the magnetic nails detected by the magnetic nail sensors 2, 3, together with the traveled distance of the motor vehicle 1 and the time data at the time lateral deviations are detected, and updates the stored lateral deviations each time magnetic nails are detected by the magnetic nail sensors 2, 3.

The steering control unit 12 controls a steering mechanism (not shown) of the motor vehicle 1 based on the azimuth deviation and the lateral deviation of the motor vehicle 1 given from the vehicle azimuth and lateral deviation calculating unit 14 to run the motor vehicle 1 in an optimum direction of travel determined by the travel planning unit 11.

The vehicle speed control unit 13 controls throttle and brake mechanisms (not shown) of the motor vehicle 1 for running the motor vehicle 1 at an optimum vehicle speed determined by the travel planning unit 11 while keeping an appropriate intervehicular distance up to a front motor vehicle which is running ahead of the motor vehicle 1.

A method of calculating a positional relationship, i.e., an azimuth deviation and a lateral deviation, of the automatically driven motor vehicle 1 with respect to the running path with the vehicle azimuth and lateral deviation calculating unit 14 according to a first embodiment of the present invention will be described below with reference to FIG. 2. In the first embodiment, an azimuth deviation and a lateral deviation of the motor vehicle 1 are calculated using data detected substantially simultaneously by the magnetic nail sensors 2, 3.

Figure 2:
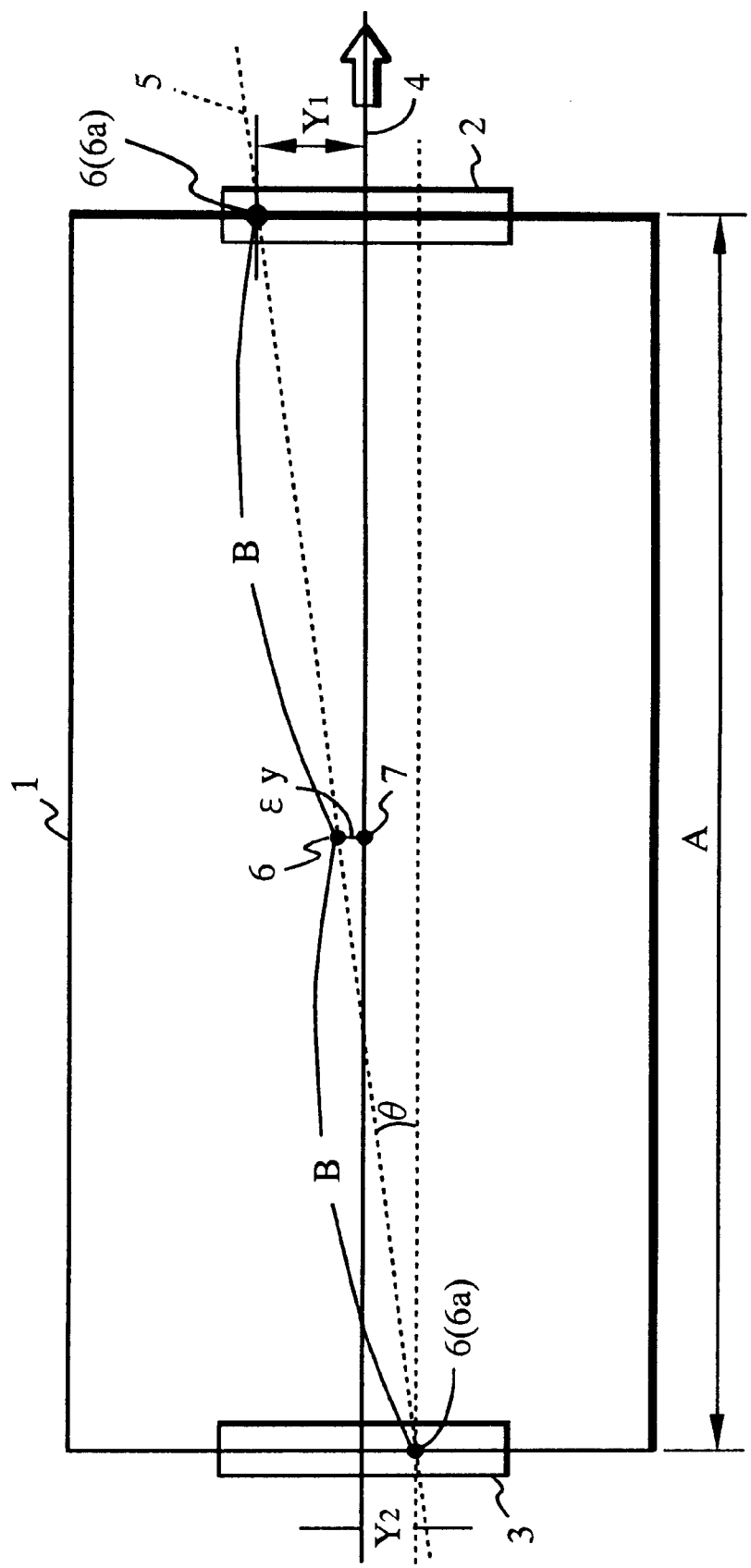
FIG. 2 is a schematic view illustrative of a method of calculating a positional relationship of the automatically driven motor vehicle shown in FIG. 1 with respect to a running path according to a first embodiment of the present invention.

In FIG. 2, the motor vehicle 1 is to run along a running path 5, and magnetic nails 6 are embedded in the road and arranged on and along the running path 5. In the first embodiment, the magnetic nails 6 are spaced at constant intervals B, and the distance A between the magnetic nail sensors 2, 3 is approximately equal to an integral multiple of each of the intervals B, i.e., twice each of the intervals B in FIG. 2. When the motor vehicle 1 runs substantially along the running path 5, the magnetic nail sensors 2, 3 substantially simultaneously detect respective magnetic nails 6a, 6b which are spaced apart from each other by a distance 2B.

In FIG. 2, the letters "θ", "$\epsilon_y$" represent an azimuth deviation and a lateral deviation, respectively, of the motor vehicle 1 which are calculated in the second embodiment. The azimuth deviation θ is an angle θ formed between the running path 5 on and along which the magnetic nails 6 are arranged and a longitudinal central axis 4 of the motor vehicle 1 which extends through a transverse center of the motor vehicle 1, i.e., an angle formed between the running path 5 and a direction of travel of the motor vehicle. The lateral deviation $\epsilon_y$ is a distance between the running path 5 and a longitudinal center 7 (center of the motor vehicle 1) of the longitudinal central axis 4 of the motor vehicle 1. This distance is mathematically equal to a distance between the center 7 of the motor vehicle 1 and the running path 5 in a direction perpendicular to the running path 5. In this embodiment, however, the distance between the center 7 of the motor vehicle 1 and the running path 5 in the transverse direction of the motor vehicle 1, i.e., a direction perpendicular to the longitudinal central axis 4 of the motor vehicle 1, serves as the lateral deviation $\epsilon_y$ of the motor vehicle 1.

In FIG. 2, the letters "$Y_1$", "$Y_2$" represent lateral deviations, respectively, detected by the respective magnetic nail sensors 2, 3. These lateral deviations $Y_1$, $Y_2$ represent distances in the transverse direction of the motor vehicle 1 from the longitudinal central axis 4 to the respective magnetic nails 6a, 6b that are positioned below the respective magnetic nail sensors 2, 3 when the motor vehicle 1 runs. It is assumed that the lateral deviations $Y_1$, $Y_2$ are positive upwardly of the central axis 4 in FIG. 2, i.e., on the left-hand side of the central axis X as viewed opposite to the direction in which the motor vehicle A travels and negative downwardly of the central axis 4 in FIG. 2, i.e., on the right-hand side of the central axis X as viewed opposite to the direction in which the motor vehicle A travels. In FIG. 2, the lateral deviation $Y_1$ is positive ($Y_1$>0), and the lateral deviation $Y_2$ is negative ($Y_2$<0).

The distance between the magnetic nail sensors 2, 3 is substantially the same as the length of the motor vehicle 1, and the magnetic nail sensors 2, 3 are positioned at equal distances A/2 forward and backward from the center 7 of the motor vehicle 1.

When lateral deviations $Y_1$, $Y_2$ of the magnetic nails 6a, 6b are substantially simultaneously detected by the respective magnetic nail sensors 2, 3 while the motor vehicle 1 is running (at this time, time data given from the timer 19 at the same time as the lateral deviations $Y_1$, $Y_2$ are substantially equal to each other), the vehicle azimuth and lateral deviation calculating unit 14 calculates an azimuth deviation θ and a lateral deviation $\epsilon_y$ of the motor vehicle 1 using the lateral deviations $Y_1$, $Y_2$ as follows:

First, as can be seen from a right triangle having a side whose length is ($Y_1$-$Y_2$) and a size whose length is A, the azimuth deviation θ is calculated from the lateral deviations $Y_1$, $Y_2$ and the distance A between the magnetic nail sensors 2, 3 according to the following equation (1):

$$\theta=\tan^{-1}[(Y_1-Y_2)/A] \qquad (1)$$

Since the distance 2B between the magnetic nails 6a, 6b is known substantially at the same time from the magnetic nail sensors 2, 3, the azimuth deviation θ may be calculated from the lateral deviations $Y_1$, $Y_2$ and the distance 2B between the magnetic nails 6a, 6b according to the following equation (2):

$$\theta=\sin^{-1}[(Y_1-Y_2)/2B] \qquad (2)$$

In view of a right triangle having an apical angle θ and a base whose length is ($Y_1$-$Y_2$) and a right triangle having an apical angle θ and a base whose length is ($\epsilon_y$-$Y_2$), and also in view of the fact that the vehicle center 7 is positioned centrally between the magnetic nail sensors 2, 3, the following equation is satisfied:

$$A:(Y_1-Y_2)=A/2:(\epsilon_y-Y_2)$$

Therefore, the lateral deviation $\epsilon_y$ of the motor vehicle 1 is calculated from the lateral deviations $Y_1$, $Y_2$ according to the following equation (3):

$$\epsilon_y=(Y_1-Y_2)/2+Y_2=(Y_1+Y_2)/2 \qquad (3)$$

The vehicle azimuth and lateral deviation calculating unit 14 calculates the equation (1) or (2) and the equation (3) to determine an azimuth deviation θ and a lateral deviation $\epsilon_y$ of the motor vehicle 1, and gives the azimuth deviation θ and the lateral deviation $\epsilon_y$ thus determined as data for automatically steering the motor vehicle 1 to the steering control unit 12, which then controls the steering of the motor vehicle 1.

Since the azimuth deviation θ and the lateral deviation $\epsilon_y$ of the motor vehicle 1 are determined using the lateral deviations $Y_1$, $Y_2$ of the magnetic nails 6a, 6b which are detected by the respective magnetic nail sensors 2, 3, the azimuth deviation θ and the lateral deviation $\epsilon_y$ can be determined with high accuracy without being largely affected by detection errors of the magnetic nail sensors 2, 3. Because the azimuth deviation θ and the lateral deviation $\epsilon_y$ can be determined highly accurately, the steering of the motor vehicle 1 can accurately be controlled to run the motor vehicle 1 along the running path 5.

In this embodiment, the distance A between the magnetic nail sensors 2, 3 is approximately equal to an integral multiple of each of the intervals B, i.e., twice each of the intervals B in FIG. 2, and it is known that the magnetic nails 6a, 6b are substantially simultaneously detected by the respective magnetic nail sensors 2, 3, the timer 19 shown in FIG. 1 may be dispensed with.

A method of calculating a positional relationship, i.e., an azimuth deviation and a lateral deviation, of the automatically driven motor vehicle 1 with respect to the running path with the vehicle azimuth and lateral deviation calculating unit 14 according to a second embodiment will be described below with reference to FIGS. 3 through 5. In the second embodiment, the distance A between the magnetic nail sensors 2, 3 is not an integral multiple of each of the equal intervals B between the magnetic nails 6 arranged on the running path 5, but may be in a range of 2B<A<3B as shown in FIGS. 3 and 4, and an azimuth deviation θ and a lateral deviation $\epsilon_y$ of the motor vehicle 1 are calculated using data detected by the magnetic nail sensors 2, 3 and time data given from the timer 19 at the time the data are detected by the magnetic nail sensors 2, 3.

The magnetic nail sensors 2, 3 on the front and rear ends of the motor vehicle 1 cannot detect respective magnetic nails 6 at the same time. Rather, the front magnetic nail sensor 2 first detects the magnetic nail 6a at a time $T_1$ as shown in an upper side of FIG. 3 to produce a lateral deviation $Y_1$ thereof, and thereafter the rear magnetic nail sensor 3 detects the magnetic nail 6b at a time $T_2$ later than the time $T_1$ as shown in a lower side of FIG. 3 to produce a lateral deviation $Y_2$ thereof, or alternatively, the rear magnetic nail sensor 3 detects a magnetic nail 6 before the front magnetic nail sensor 3 detects a magnetic nail 6 as shown in FIG. 4.

Figure 3:
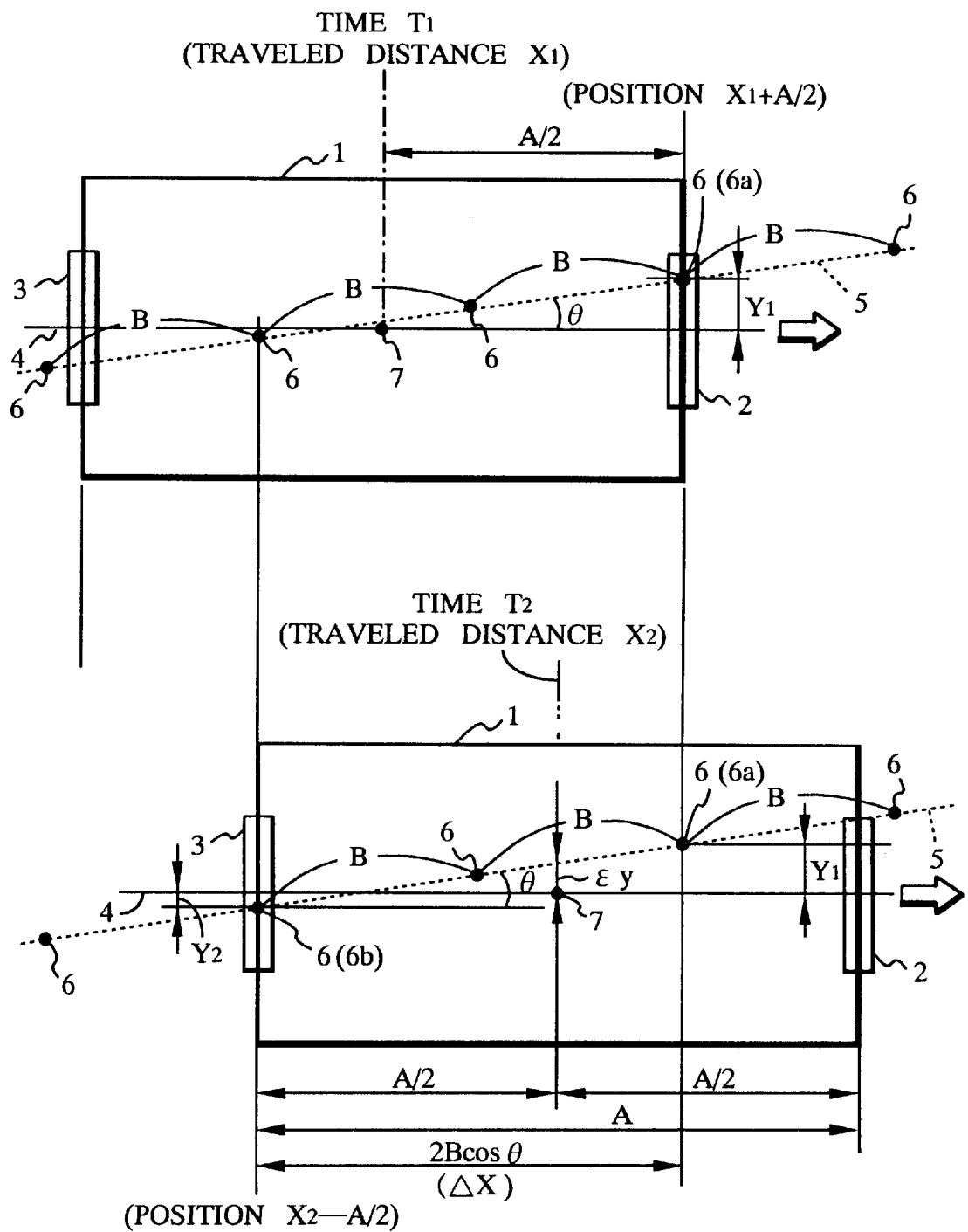
FIG. 3 is a schematic view illustrative of methods of calculating a positional relationship of the automatically driven motor vehicle shown in FIG. 1 with respect to a running path according to second and third embodiments of the present invention.
Figure 4:
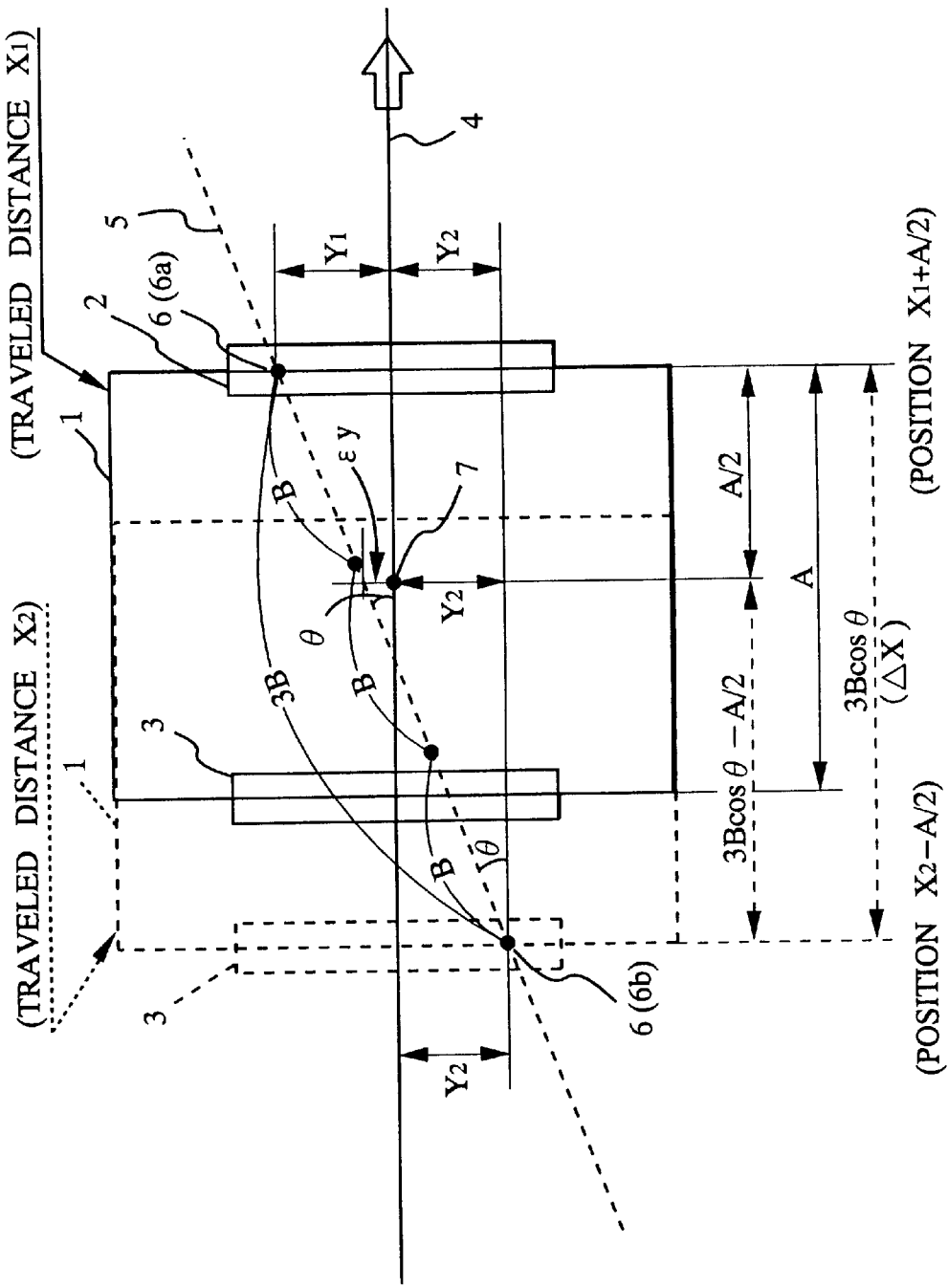
FIG. 4 is a schematic view illustrative of the methods of calculating a positional relationship of the automatically driven motor vehicle shown in FIG. 1 with respect to a running path according to the second and third embodiments of the present invention.

When the magnetic nail sensors 2, 3 detect a magnetic nail 6, the vehicle azimuth and lateral deviation calculating unit 14 compares time data which are given from the timer 19 together with the detected data (lateral deviation) from the magnetic nail sensors 2, 3 to decide a former case shown FIG. 3 or a latter case shown in FIG. 4. The vehicle azimuth and lateral deviation calculating unit 14 then effects calculations depending on the decided case to determine an azimuth deviation θ and a lateral deviation $\epsilon_y$ of the motor vehicle 1.

More specifically, if the time at which the detected data from the front magnetic nail sensor 2 are updated, i.e., the time at which the front magnetic nail sensor 2 detects a magnetic nail 6, is later than the time at which the detected data from the rear magnetic nail sensor 2 are updated, i.e., the time at which the rear magnetic nail sensor 3 detects a magnetic nail 6 as determined by the comparison of the time data, then the situation is decided as the case shown in FIG. 3. In this case, the vehicle azimuth and lateral deviation calculating unit 14 calculates an azimuth deviation θ and a lateral deviation $\epsilon_y$ of the motor vehicle 1 as follows:

As can be seen from FIG. 3, since the distance between the magnetic nails 6a, 6b successively detected by the respective magnetic nail sensors 2, 3 is 2B, an azimuth deviation θ of the motor vehicle 1 is calculated using the distance 2B and the lateral deviations $Y_1$, $Y_2$ ($Y_1 > 0$, $Y_2 < 0$ in FIG. 3) of the magnetic nails 6a, 6b which are detected by the respective magnetic nail sensors 2, 3, according to the following equation (4):

$$\theta = \sin^{-1}[(Y_1 - Y_2)/2B] \tag{4}$$

Since $2B \cdot \cos\theta : (Y_1 - Y_2) = A/2 : (\epsilon_y - Y_2)$ as is apparent from FIG. 3, a lateral deviation $\epsilon_y$ of the motor vehicle 1 is calculated using the azimuth deviation θ, the distance 2B between the magnetic nails 6a, 6b, the lateral deviations $Y_1$, $Y_2$, and the distance A between the magnetic nail sensors 2, 3 according to the following equation (5):

$$\epsilon_y = A \cdot (Y_1 Y_2)/(4B \cdot \cos\theta) + Y_2 \tag{5}$$

The above process of calculating the equations (4) and (5) is referred to as a "process 1".

If the time at which the detected data from the rear magnetic nail sensor 3 are updated is later than the time at which the detected data from the front magnetic nail sensor 2 are updated as determined by the comparison of the time data, then the situation is decided as the case shown in FIG. 4. In this case, the vehicle azimuth and lateral deviation calculating unit 14 calculates an azimuth deviation θ and a lateral deviation $\epsilon_y$ of the motor vehicle 1 as follows:

As can be seen from FIG. 4, since the distance between the magnetic nails 6a, 6b successively detected by the respective magnetic nail sensors 2, 3 is 3B, an azimuth deviation θ of the motor vehicle 1 is calculated using the distance 3B and the lateral deviations $Y_1$, $Y_2$ ($Y_1 > 0$, $Y_2 < 0$ in FIG. 4) of the magnetic nails 6a, 6b which are detected by the respective magnetic nail sensors 2, 3, according to the following equation (6):

$$\theta = \sin^{-1}[(Y_1 - Y_2)/3B] \tag{6}$$

Since $3B \cdot \cos\theta : (Y_1 - Y_2) = (3B \cdot \cos\theta - A/2) : (\epsilon_y - Y_2)$ as is apparent from FIG. 4, a lateral deviation $\epsilon_y$ of the motor vehicle 1 is calculated using the azimuth deviation θ, the distance 3B between the magnetic nails 6a, 6b, the lateral deviations $Y_1$, $Y_2$, and the distance A between the magnetic nail sensors 2, 3 according to the following equation (7):

$$\epsilon_y = [(Y_1 - Y_2) \cdot (3B \cdot \cos\theta - A/2)]/(3B \cdot \cos\theta) + Y_2 \tag{7}$$

The above process of calculating the equations (6) and (7) is referred to as a "process 2".

Figure 5:
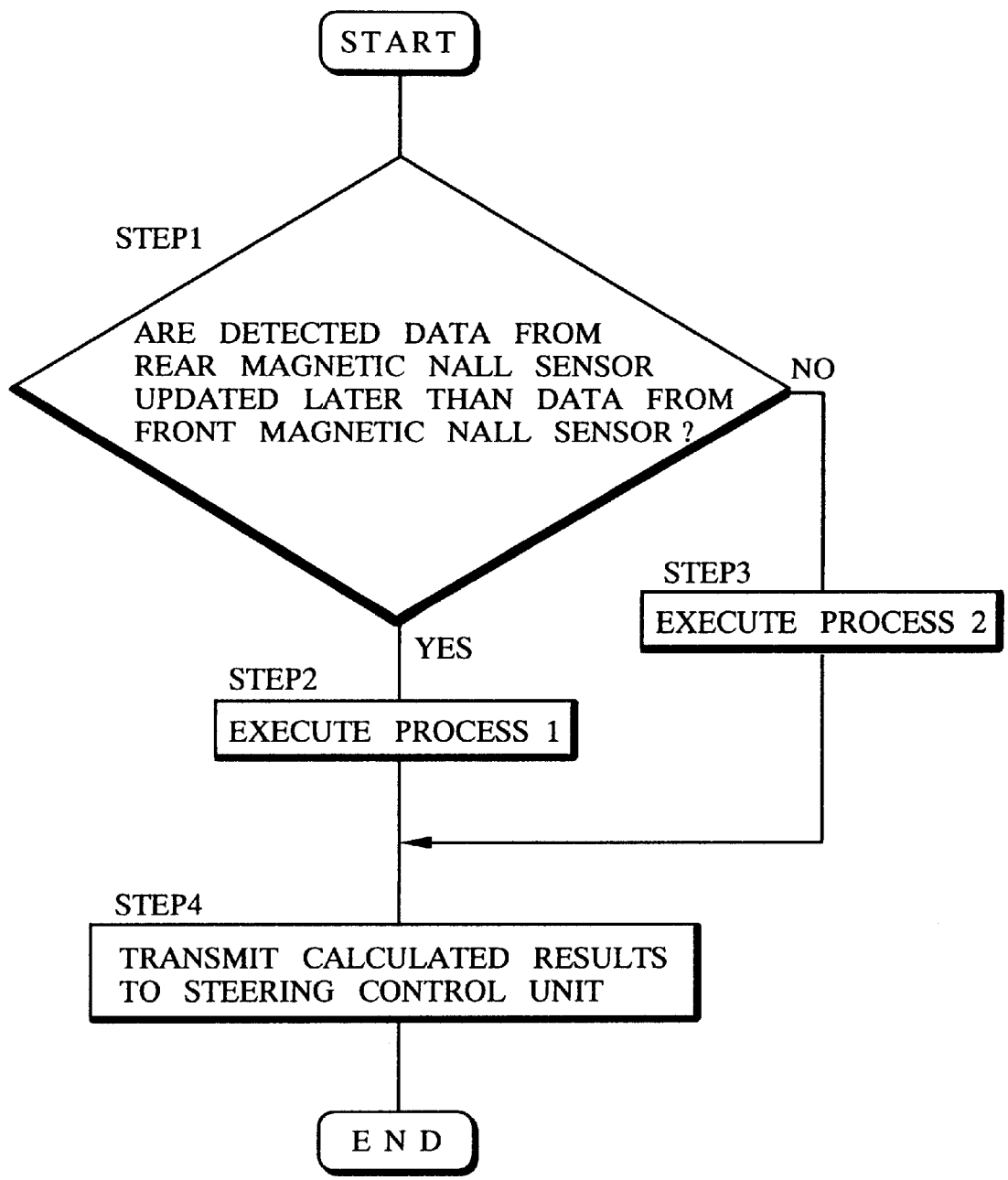
FIG. 5 is a flowchart of the method of calculating a positional relationship of the automatically driven motor vehicle shown in FIG. 1 with respect to a running path according to the second embodiment of the present invention.

The vehicle azimuth and lateral deviation calculating unit 14 performs the above operation according to a flowchart shown in FIG. 5. First, the vehicle azimuth and lateral deviation calculating unit 14 determines whether the detected data from the rear magnetic nail sensor 3 are updated later than the detected data from the front magnetic nail sensor 2 are updated as determined by the comparison of the time data accompanied by the detected data from the magnetic nail sensors 2, 3 in STEP 1. If YES in STEP 1 (i.e., the case shown in FIG. 3), then the vehicle azimuth and lateral deviation calculating unit 14 carries out the process 1 in STEP 2. If NO in STEP 1 (i.e., the case shown in FIG. 4), then the vehicle azimuth and lateral deviation calculating unit 14 carries out the process 2 in STEP 3.

The vehicle azimuth and lateral deviation calculating unit 14 transmits the azimuth deviation θ and the lateral deviation $\epsilon_y$ thus determined as data for automatically steering the motor vehicle 1 to the steering control unit 12 in STEP 4 for controlling the steering of the motor vehicle 1.

In this embodiment, even though the distance A between the magnetic nail sensors 2, 3 on the front and rear ends of the motor vehicle 1 is not an integral multiple of the interval B between adjacent magnetic nails 6 and hence two magnetic nails are not simultaneously detected by the magnetic nail sensors 2, 3, the vehicle azimuth and lateral deviation calculating unit 14 effects calculations depending on the times at which the magnetic nail sensors 2, 3 detect respective magnetic nails 6 to determine an azimuth deviation θ and a lateral deviation $\epsilon_y$ of the motor vehicle 1 using lateral deviations $Y_1$, $Y_2$ of the magnetic nails 6a, 6b which are detected at the different times by the magnetic nail sensors 2, 3. Since the distance A between the magnetic nail sensors 2, 3 may not be an integral multiple of the interval B between adjacent magnetic nails 6, the data from the magnetic nail sensors 2, 3 may be inputted at a smaller time interval than if the distance A is an integral multiple of the interval B. This allows the detection of states of a latest motor vehicle which undergoes a small time delay between the detected data from the magnetic nail sensors 2, 3. Furthermore, it also permits the magnetic nail sensors 2, 3 to be installed on the motor vehicle 1 with increased freedom, and hence makes the method more versatile in its application to automatically driven motor vehicles.

In the illustrated second embodiment, the distance A between the magnetic nail sensors 2, 3 on the front and rear ends of the motor vehicle 1 is not an integral multiple of the interval B between adjacent magnetic nails 6 and hence two magnetic nails are detected with a time difference by the magnetic nail sensors 2, 3. However, the method according to the second embodiment may be modified to calculate an azimuth deviation θ and a lateral deviation $\epsilon_y$ of the motor vehicle 1 even when two magnetic nails are not simultaneously detected by the magnetic nail sensors 2, 3. Specifically, the calculating process according to the first embodiment may be carried out when the time data from the timer 19 which are accompanied by the detected data from the magnetic nail sensors 2, 3 are substantially equal to each other, i.e., when the times at which the detected data from the magnetic nail sensors 2, 3 are updated are substantially equal to each other. This modification makes the method much more versatile in its application to automatically driven motor vehicles.

A method of calculating a positional relationship, i.e., an azimuth deviation and a lateral deviation, of the automatically driven motor vehicle 1 with respect to the running path with the vehicle azimuth and lateral deviation calculating unit 14 according to a third embodiment will be described below with reference to FIGS. 3 and 4. In the third embodiment, the distance A between the magnetic nail sensors 2, 3 is not an integral multiple of each of the equal intervals B (constant intervals) between the magnetic nails 6, but may be in a range of 2B<A<3B, as with the second embodiment, and an azimuth deviation θ and a lateral deviation $\epsilon_y$ of the motor vehicle 1 are calculated using data detected by the magnetic nail sensors 2, 3 and traveled distance data given from the traveled distance calculating unit 16 at the time the data are detected by the magnetic nail sensors 2, 3.

As with the second embodiment, the detected data (the lateral deviation $Y_1$ of a magnetic nail 6) from the front magnetic nail sensor 2 may be earlier than the detected data (the lateral deviation $Y_2$ of a magnetic nail 6) from the rear magnetic nail sensor 3 (the case shown in FIG. 3), or alternatively, the detected data (the lateral deviation $Y_1$ of a magnetic nail 6) from the front magnetic nail sensor 2 may be later than the detected data (the lateral deviation $Y_2$ of a magnetic nail 6) from the rear magnetic nail sensor 3 (the case shown in FIG. 4).

It is now assumed that a traveled distance traversed by the motor vehicle 1 as calculated by the traveled distance calculating unit 16 when the front magnetic nail sensor 2 detects a magnetic nail 6 is represented by $X_1$, a traveled distance traversed by the motor vehicle 1 as calculated by the traveled distance calculating unit 16 when the rear magnetic nail sensor 3 detects a magnetic nail 6 is represented by $X_2$, and the traveled distances $X_1$, $X_2$ indicate respective traveled points on the running path 5 which have been reached by the vehicle center 7. The position on the running path 5 of the front magnetic nail sensor 2 at the time the front magnetic nail sensor 2 detects a magnetic nail 6 is spaced from the location of the vehicle center 7 at the traveled distance $X_1$ forward by half A/2 of the distance A between the magnetic nail sensors 2, 3 in the direction in which the motor vehicle 1 travels, i.e., is indicated by $X_1+A/2$. Similarly, the position on the running path 5 of the rear magnetic nail sensor 3 at the time the rear magnetic nail sensor 3 detects a magnetic nail 6 is spaced from the location of the vehicle center 7 at the traveled distance $X_2$ backward by half A/2 of the distance A between the magnetic nail sensors 2, 3 in the direction opposite to the direction in which the motor vehicle 1 travels, i.e., is indicated by $X_2-A/2$. Therefore, the distance difference ΔX between the positions of the magnetic nail sensors 2, 3 in the direction in which the motor vehicle 1 travels at the time the magnetic nail sensors 2, 3 detect respective magnetic nails 6 is expressed by:

$$\Delta x = |(X_1+A/2)-(X_2-A/2)| = |X_1-X_2+A| \quad (8)$$

In the case shown in FIG. 3, the distance difference ΔX is smaller than the distance A between the magnetic nail sensors 2, 3 (ΔX=2B), as shown in FIG. 3. In the case shown in FIG. 4, the distance difference ΔX is greater than the distance A between the magnetic nail sensors 2, 3 (ΔX≈3B), as shown in FIG. 4. Therefore, the magnitude of the distance difference ΔX with respect to the distance A between the magnetic nail sensors 2, 3 represents the chronological relationship of the detected data read from the magnetic nail sensors 2, 3 into the vehicle azimuth and lateral deviation calculating unit 14.

For calculating an azimuth deviation θ and a lateral deviation $\epsilon_y$ of the motor vehicle 1, the vehicle azimuth and lateral deviation calculating unit 14 first determines a distance difference ΔX from the detected data (lateral deviations $Y_1$, $Y_2$) from the magnetic nail sensors 2, 3 and data of the traveled distances $X_1$, $X_2$ from the traveled distance calculating unit 16 according to the above equation (8), and then compares the determined distance difference ΔX with the distance A between the magnetic nail sensors 2, 3. If the distance difference ΔX is smaller than the distance A (ΔX<A), then since the situation is the case shown in FIG. 3, the vehicle azimuth and lateral deviation calculating unit 14 calculates an azimuth deviation θ and a lateral deviation $\epsilon_y$ according to the equations (4), (5) as with the second embodiment. If the distance difference ΔX is greater than the distance A (ΔX>A), then since the situation is the case shown in FIG. 4, the vehicle azimuth and lateral deviation calculating unit 14 calculates an azimuth deviation θ and a lateral deviation $\epsilon_y$ according to the equations (6), (7) as with the second embodiment.

The vehicle azimuth and lateral deviation calculating unit 14 then gives the azimuth deviation θ and the lateral deviation $\epsilon_y$ thus determined as data for automatically steering the motor vehicle 1 to the steering control unit 12, which then controls the steering of the motor vehicle 1.

According to the third embodiment, as with the second embodiment, an azimuth deviation θ and a lateral deviation $\epsilon_y$ of the motor vehicle 1 can be determined highly accurately using the lateral deviations $Y_1$, $Y_2$ of the respective magnetic nails 6a, 6b which are detected at different times by the magnetic nail sensors 2, 3. Since the distance A between the magnetic nail sensors 2, 3 may not be an integral multiple of the interval B between adjacent magnetic nails 6, the data from the magnetic nail sensors 2, 3 may be inputted at a smaller time interval than if the distance A is an integral multiple of the interval B. This allows the detection of states of a latest motor vehicle which undergoes a small time delay between the detected data from the magnetic nail sensors 2, 3. Furthermore, it also permits the magnetic nail sensors 2, 3 to be installed on the motor vehicle 1 with increased freedom, and hence makes the method more versatile in its application to automatically driven motor vehicles.

If the distance A between the magnetic nail sensors 2, 3 is an integral multiple of the interval B between adjacent magnetic nails 6, i.e., if two magnetic nails are detected substantially simultaneously by the magnetic nail sensors 2, 3, then because the distance difference ΔX is substantially equal to the distance A between the magnetic nail sensors 2, 3, the calculating process according to the first embodiment may be carried out to determine an azimuth deviation θ and a lateral deviation $\epsilon_y$ of the motor vehicle 1.

A method of calculating a positional relationship, i.e., an azimuth deviation and a lateral deviation, of the automatically driven motor vehicle 1 with respect to the running path with the vehicle azimuth and lateral deviation calculating unit 14 according to a fourth embodiment of the present invention will be described below with reference to FIGS. 6 through 8. In the fourth embodiment, magnetic nails 6 on the running path 5 are not spaced at constant intervals as shown in FIGS. 6 through 8, and an azimuth deviation θ and a lateral deviation $\epsilon_y$ of the motor vehicle 1 are calculated using detected data given from the magnetic nail sensors 2, 3 and traveled distance data given from the traveled distance calculating unit 16 at the time the data are detected by the magnetic nail sensors 2, 3.

Figure 6:
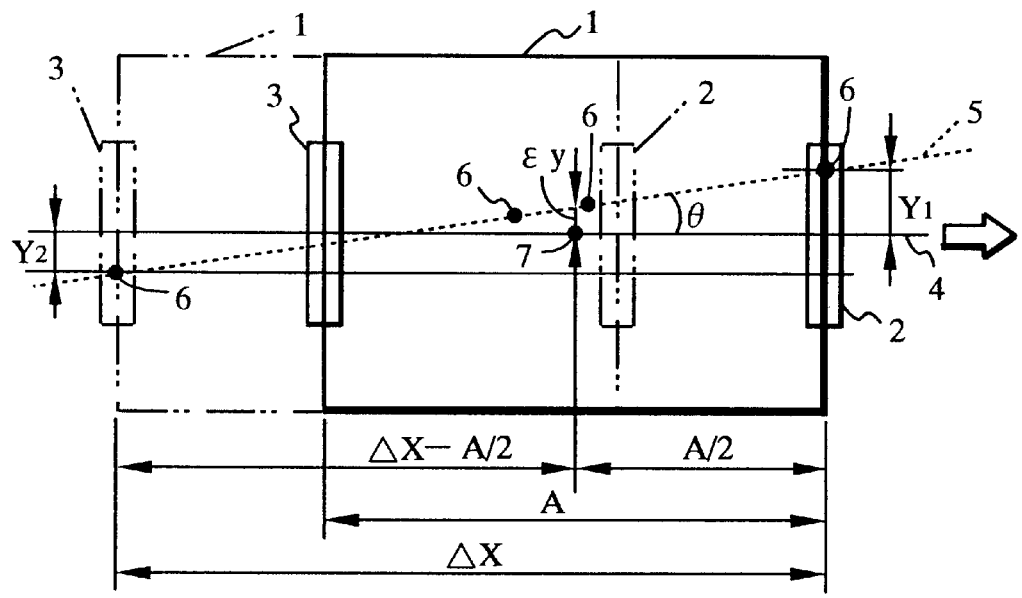
FIG. 6 is a schematic view illustrative of a method of calculating a positional relationship of the automatically driven motor vehicle shown in FIG. 1 with respect to a running path according to a fourth embodiment of the present invention.
Figure 7:
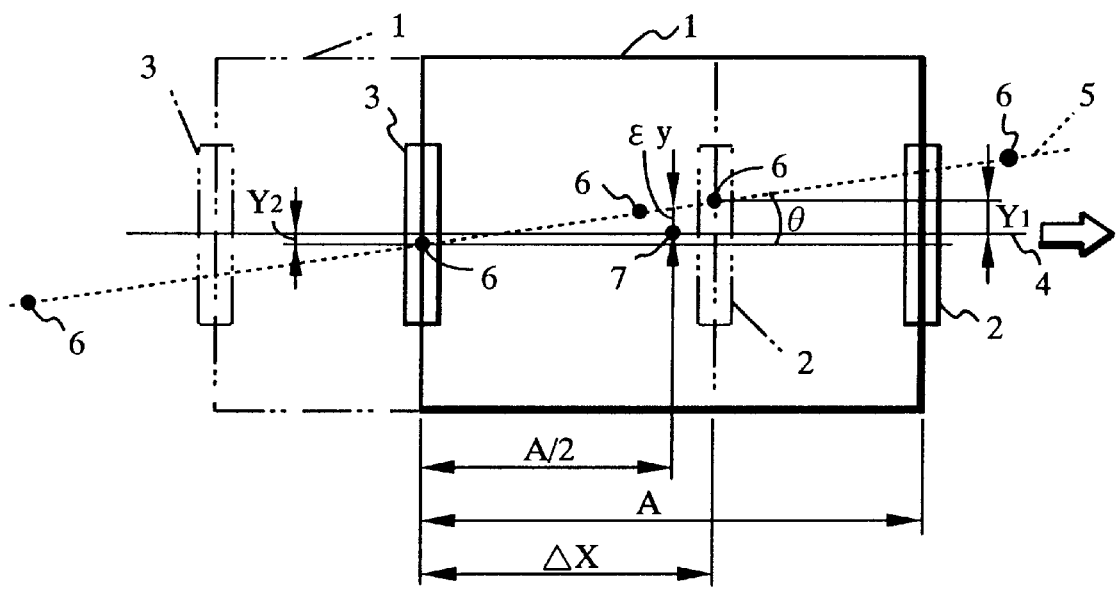
FIG. 7 is a schematic view illustrative of the method of calculating a positional relationship of the automatically driven motor vehicle shown in FIG. 1 with respect to a running path according to the fourth embodiment of the present invention.
Figure 8:
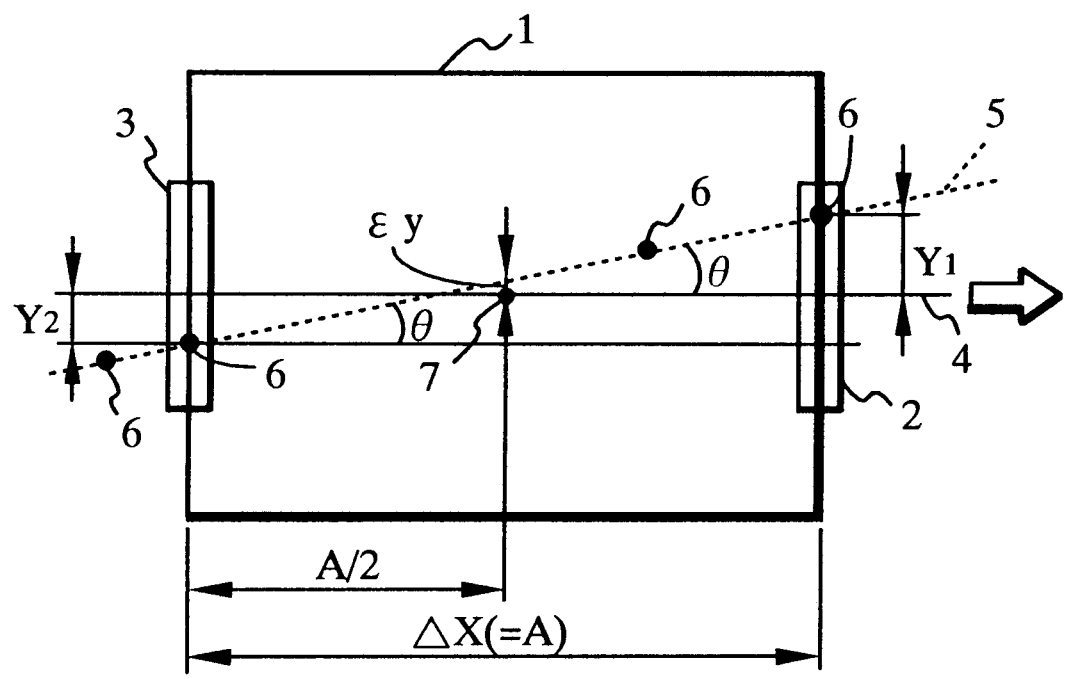
FIG. 8 is a schematic view illustrative of the method of calculating a positional relationship of the automatically driven motor vehicle shown in FIG. 1 with respect to a running path according to the fourth embodiment of the present invention.

The relationship between the distance difference ΔX (see the equation (8)) described in the third embodiment and the distance A between the magnetic nail sensors 2, 3 will be analyzed with reference to FIGS. 6 through 8. Since the distance between two adjacent magnetic nails 6 is not constant with respect to the distance A between the magnetic nail sensors 2, 3, there are three cases that are applicable, i.e., a case in which the distance difference ΔX is greater than the distance A (ΔX>A) (the detected data from the front magnetic nail sensor 2 which are read into the vehicle azimuth and lateral deviation calculating unit 14 are updated later than the detected data from the rear magnetic nail sensor 3 which are read into the vehicle azimuth and lateral deviation calculating unit 14 are updated) as shown in FIG. 6, a case in which the distance difference ΔX is smaller than the distance A (ΔX<A) (the detected data from the front magnetic nail sensor 2 which are read into the vehicle azimuth and lateral deviation calculating unit 14 are updated earlier than the detected data from the rear magnetic nail sensor 3 which are read into the vehicle azimuth and lateral deviation calculating unit 14 are updated) as shown in FIG. 7, and a case in which the distance difference ΔX is substantially equal to the distance A (ΔX=A) (the detected data from the front magnetic nail sensors 2, 3 which are read into the vehicle azimuth and lateral deviation calculating unit 14 are updated substantially at the same time as each other) as shown in FIG. 8.

In either one of the cases shown in FIGS. 6 through 8, as can be seen from FIGS. 6 through 8, an azimuth deviation θ of the motor vehicle 1 is calculated using the lateral deviations $Y_1$, $Y_2$ represented by the detected data from the magnetic nail sensors 2, 3 and the distance difference ΔX according to the following equation (9):

$$\theta = \tan^{-1}[(Y_1 - Y_2)/\Delta X] \tag{9}$$

In the case shown in FIG. 8, ΔX=A in the equation (9), and hence the distance A may be used in place of the distance difference ΔX. Therefore, in the case shown in FIG. 8, the equation (9) is the same as the equation (1) according to the first embodiment.

In the case shown in FIG. 6 (ΔX>A), as can be seen from FIG. 6, the following equation is satisfied:

$$(Y_1 - Y_2) : \Delta X = (\epsilon_y - Y_2) : (\Delta X - A/2)$$

Therefore, a lateral deviation $\epsilon_y$ can be determined using the lateral deviations $Y_1$, $Y_2$, the distance difference ΔX, and the distance A between the magnetic nail sensors 2, 3 according to the following equation (10):

$$\epsilon_y = (Y_1 - Y_2)(\Delta X - A/2)/\Delta X + Y_2 \tag{10}$$

In the case shown in FIG. 7 (ΔX<A), as can be seen from FIG. 7, the following equation is satisfied:

$$(Y_1 - Y_2) : \Delta X = (\epsilon_y - Y_2) : A/2$$

Therefore, a lateral deviation $\epsilon_y$ can be determined using the lateral deviations $Y_1$, $Y_2$, the distance difference ΔX, and the distance A between the magnetic nail sensors 2, 3 according to the following equation (11):

$$\epsilon_y = A \cdot (Y_1 - Y_2)/2\Delta X + Y_2 \tag{11}$$

In the case shown in FIG. 8 (ΔX=A), since the following equation is satisfied:

$$(Y_1 - Y_2) : \Delta X = (\epsilon_y - Y_2) : \Delta X/2$$

a lateral deviation $\epsilon_y$ can be determined from the lateral deviations $Y_1$, $Y_2$ according to the following equation (12):

$$\epsilon_y = (Y_1 - Y_2)/2 + Y_2 = (Y_1 + Y_2)/2 \tag{12}$$

The equation (12) is the same as the equation (3) described in the first embodiment above.

For calculating an azimuth deviation θ and a lateral deviation $\epsilon_y$ of the motor vehicle 1, the vehicle azimuth and lateral deviation calculating unit 14 determines a distance difference ΔX from the detected data (lateral deviations $Y_1$, $Y_2$) from the magnetic nail sensors 2, 3 and data of the traveled distances $X_1$, $X_2$ from the traveled distance calculating unit 16 according to the above equation (8), as with the third embodiment. Then, the vehicle azimuth and lateral deviation calculating unit 14 determines an azimuth deviation θ from the distance difference ΔX and the lateral deviations $Y_1$, $Y_2$ according to the equation (9).

Furthermore, the vehicle azimuth and lateral deviation calculating unit 14 compares the distance difference ΔX with the distance A between the magnetic nail sensors 2, 3. If ΔX>A, then since the situation is the case shown in FIG. 6, the vehicle azimuth and lateral deviation calculating unit 14 calculates a lateral deviation $\epsilon_y$ according to the equation (10). If ΔX<A, then since the situation is the case shown in FIG. 7, the vehicle azimuth and lateral deviation calculating unit 14 calculates a lateral deviation $\epsilon_y$ according to the equation (11). If ΔX=A, then since the situation is the case shown in FIG. 8, the vehicle azimuth and lateral deviation calculating unit 14 calculates a lateral deviation $\epsilon_y$ according to the equation (12).

The vehicle azimuth and lateral deviation calculating unit 14 gives the azimuth deviation θ and the lateral deviation $\epsilon_y$ thus determined as data for automatically steering the motor vehicle 1 to the steering control unit 12, which then controls the steering of the motor vehicle 1.

In the fourth embodiment, even though the magnetic nails 6 on the running path 5 are not spaced at equal intervals, an azimuth deviation θ and a lateral deviation $\epsilon_y$ of the motor vehicle 1 can be determined with high accuracy using the lateral deviations $Y_1$, $Y_2$ of the magnetic nails 6 which are detected by the respective magnetic nail sensors 2, 3 either at different times or substantially at the same time.

In each of the first through fourth embodiments, the magnetic nail sensor 2 or 3 may malfunction or one of the magnetic nail sensors 2, 3 may fail to detect a magnetic nail 6 due to snaking or vertical motion of the motor vehicle 1. In such a case, an azimuth deviation θ and a lateral deviation $\epsilon_y$ may not be calculated according to the above calculating process, and hence the steering of the motor vehicle 1 may not be controlled in the manner described above.

When such a trouble arises, in each of the first through fourth embodiments, an azimuth deviation θ and a lateral deviation $\epsilon_y$ of the motor vehicle 1 are determined using the detected data from one of the magnetic nail sensors 2, 3 and the data of the traveled distance of the motor vehicle 1 from the traveled distance calculating unit 16.

Figure 9:
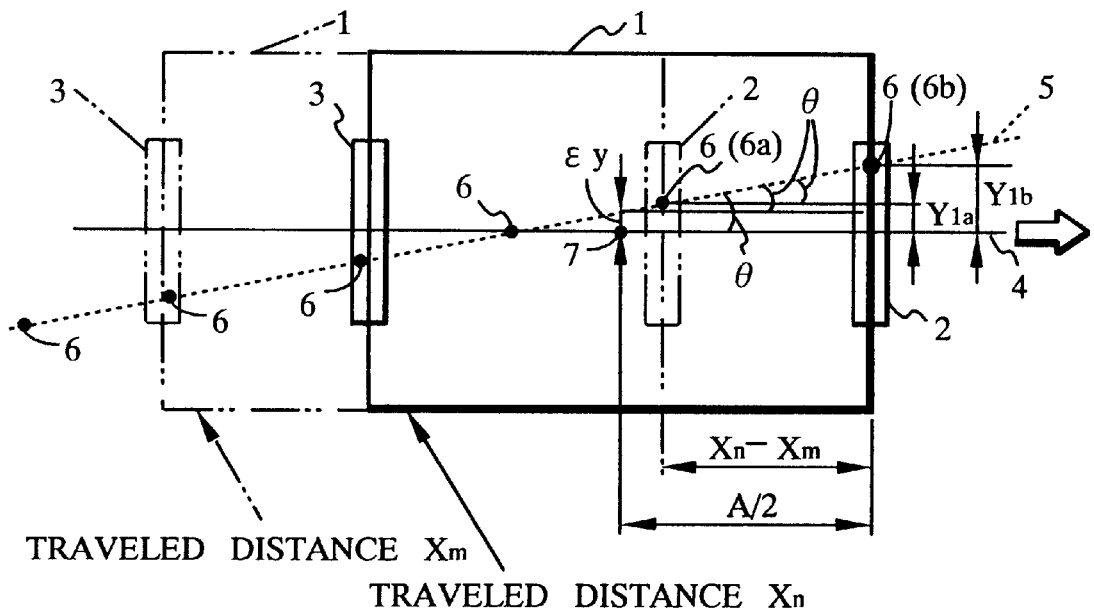
FIG. 9 is a schematic view illustrative of a method of calculating a positional relationship of the automatically driven motor vehicle shown in FIG. 1 with respect to a running path in the event that one of a pair of magnetic nail sensors fails to detect magnetic nails.

Specifically, as shown in FIG. 9, if the rear magnetic nail sensor 3 fails to detect a magnetic nail 6 while the motor vehicle 1 is running substantially along the running path 5, then the front magnetic nail sensor 2 successively detects adjacent magnetic nails 6a, 6b on the running path 5 as the motor vehicle 1 progresses, and lateral deviations $Y_{1a}$, $Y_{1b}$ of the magnetic nails 6a, 6b are obtained. If it is assumed that a traveled distance traversed by the motor vehicle 1 when the front magnetic nail sensor 2 detects the magnetic nail 6a is represented by $X_m$, and a traveled distance traversed by the motor vehicle 1 when the front magnetic nail sensor 2 detects the magnetic nail 6b is represented by $X_n$, then, as can be seen from FIG. 9, an azimuth deviation θ of the motor vehicle 1 with respect to the running path 5 can be determined using a distance $(X_n-X_m)$ which is traveled by the motor vehicle 1 between the times when the magnetic nails 6a, 6b are detected, and the lateral deviations $Y_{1a}$, $Y_{1b}$, according to the following equation (13):

$$\theta = \tan^{-1}[(Y_{1b}-Y_{1a})/(X_n-X_m)] \qquad (13)$$

A lateral deviation $\epsilon_y$ of the motor vehicle 1 at the time when the magnetic nail 6b is detected can be determined from the azimuth deviation $\theta$ and the lateral deviation $Y_{1b}$ according to the following equation (14):

$$\epsilon_y = Y_{1b} - [(A/2) \cdot \tan\theta] \qquad (14)$$

Since $\tan\theta = (Y_{1b}-Y_{1a})/(X_n-X_m)$ from the equation (13), a lateral deviation $\epsilon_y$ may also be determined using the lateral deviations $Y_{1a}$, $Y_{1b}$ according to the following equation (15):

$$\epsilon_y = Y_{1b} - [(A/2) \cdot (Y_{1b}-Y_{1a})/(X_n-X_m)] \qquad (15)$$

Figure 10:
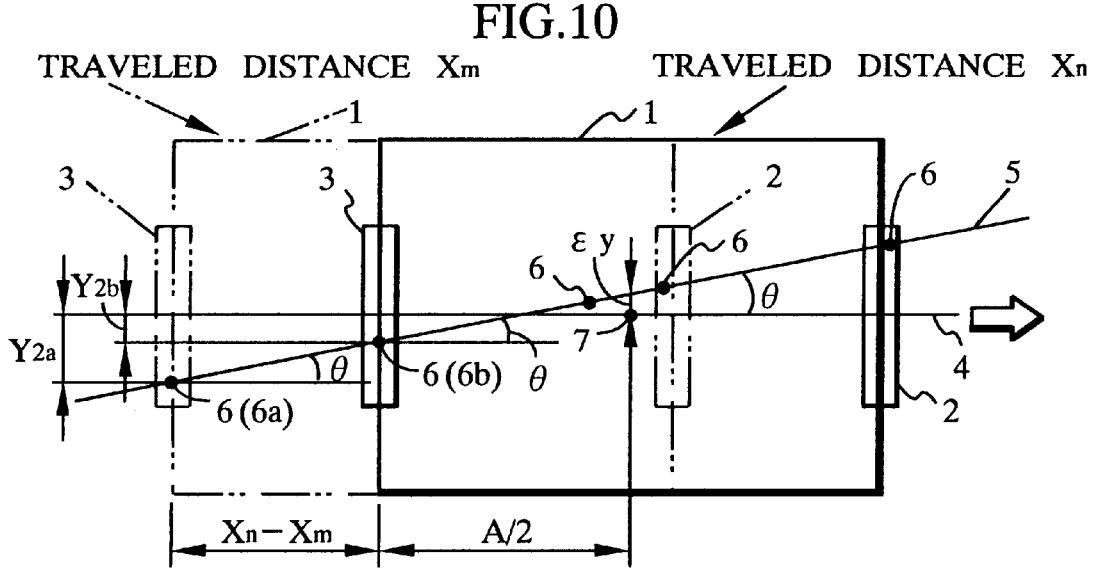
FIG. 10 is a schematic view illustrative of a method of calculating a positional relationship of the automatically driven motor vehicle shown in FIG. 1 with respect to a running path in the event that the other of a pair of magnetic nail sensors fails to detect magnetic nails.

As shown in FIG. 10, if the front magnetic nail sensor 2 fails to detect a magnetic nail 6, then the rear magnetic nail sensor 3 successively detects adjacent magnetic nails 6a, 6b on the running path 5 as the motor vehicle 1 progresses, and lateral deviations $Y_{2a}$, $Y_{2b}$ of the magnetic nails 6a, 6b are obtained ($Y_{2a}<0$, $Y_{2b}<0$).

As can be seen from FIG. 10, an azimuth deviation $\theta$ of the motor vehicle 1 with respect to the running path 5 can be determined using a distance $(X_n-X_m)$ which is traveled by the motor vehicle 1 between the times when the magnetic nails 6a, 6b are detected, and the lateral deviations $Y_{2a}$, $Y_{2b}$, according to the following equation (16):

$$\theta = \tan^{-1}[(Y_{2b}-Y_{2a})/(X_n-X_m)] \qquad (16)$$

A lateral deviation $\epsilon_y$ of the motor vehicle 1 at the time when the magnetic nail 6b is detected can be determined from the azimuth deviation $\theta$ and the lateral deviation $Y_{2b}$ according to the following equation (17):

$$\epsilon_y = Y_{2b} + [(A/2) \cdot \tan\theta] \qquad (17)$$

Since $\tan\theta = (Y_{2b}-Y_{2a})/(X_n-X_m)$ from the equation (16), a lateral deviation $\epsilon_y$ may also be determined using the lateral deviations $Y_{2a}$, $Y_{2b}$ according to the following equation (18):

$$\epsilon_y = Y_{2b} + [(A/2) \cdot Y_{2b}-Y_{2a})/(X_n-X_m)] \qquad (10)$$

As described above, if one of the magnetic nail sensors 2, 3 fails to detect a magnetic nail 6 due to malfunctioning of the magnetic sensor 2 or 3 or snaking or vertical motion of the motor vehicle 1, e.g., if the rear magnetic sensor 3 fails to detect a magnetic nail 6 (the case shown in FIG. 9), an azimuth deviation $\theta$ of the motor vehicle 1 is determined using the lateral deviations $Y_{1a}$, $Y_{1b}$ successively detected by the front magnetic nail sensor 2 according to the equation (13), and a lateral deviation $\epsilon_y$ of the motor vehicle 1 is then determined according to the equation (14) or (15).

If the front magnetic sensor 2 fails to detect a magnetic nail 6 (the case shown in FIG. 10), an azimuth deviation $\theta$ of the motor vehicle 1 is determined using the lateral deviations $Y_{2a}$, $Y_{2b}$ successively detected by the rear magnetic nail sensor 2 according to the equation (16), and a lateral deviation $\epsilon_y$ of the motor vehicle 1 is then determined according to the equation (17) or (18). The azimuth deviation $\theta$ and the lateral deviation $\epsilon_y$ thus determined are given as data for automatically steering the motor vehicle 1 to the steering control unit 12, which then controls the steering of the motor vehicle 1.

Consequently, even in the event that one of the magnetic nail sensors 2, 3 fails to detect a magnetic nail 6, an azimuth deviation 6 and a lateral deviation $\epsilon_y$ of the motor vehicle 1 are determined as makeshift data using only the detected from the other magnetic nail sensor for accurately controlling the steering of the motor vehicle 1 to run along the running path 5.

When one of the magnetic nail sensors 2, 3 fails to detect a magnetic nail 6, it is possible to use a lateral deviation detected by the other magnetic nail sensor as a lateral deviation $\epsilon_y$ of the motor vehicle 1 for controlling the steering of the motor vehicle 1. In such a case, however, a lateral deviation detected by the other magnetic nail sensor may largely differ from a lateral deviation of the motor vehicle 1 which is necessary to effect steering control, tending to fail to accurately steer the motor vehicle 1. According to the embodiments of the present invention, however, since a lateral deviation of the motor vehicle 1 is determined using a lateral deviation detected by the other magnetic nail sensor, the determined lateral deviation of the motor vehicle 1 is of such a continuous nature as to be able to accurately control the steering of the motor vehicle 1.

Although certain preferred embodiments of the present invention have been shown and described in detail, it should be understood that various changes and modifications may be made therein without departing from the scope of the appended claims.

What is claimed is:

1. A method of calculating a positional relationship, with respect to a running path on a road, of a motor vehicle which is automatically steered to run along the running path while detecting magnetic sources that are arranged on the road at spaced intervals along the running path, comprising the steps of:

providing a pair of magnetic source detecting means on respective front and rear portions of the motor vehicle, for detecting lateral deviations of magnetic sources with respect to the motor vehicle at the respective front and rear portions thereof, said magnetic source detecting means being spaced from each other by a distance which is substantially an integral multiple of the interval between adjacent two of the magnetic sources; and calculating an azimuth deviation or a lateral deviation of the motor vehicle with respect to the running path based on lateral deviations of the magnetic sources which are detected substantially simultaneously by said magnetic source detecting means, respectively.

2. A method according to claim 1, wherein said azimuth deviation of said motor vehicle comprises an angle formed between a traveled direction in which the motor vehicle travels and said running path, and is calculated according to a predetermined equation from the lateral deviations of the magnetic sources which are detected by said magnetic source detecting means, respectively, and either the interval between the magnetic sources which are detected substantially simultaneously by said magnetic source detecting means, respectively, or the distance between said magnetic source detecting means.

3. A method according to claim 1, wherein said lateral deviation of said motor vehicle comprises a lateral deviation of a center of the motor vehicle with respect to said running path, and is calculated according to a predetermined equation depending on a geometric positional relationship between the center of the motor vehicle and said magnetic source detecting means, from the lateral deviations of the magnetic sources which are detected by said magnetic source detecting means, respectively.

4. A method according to claim 1, wherein if one of said magnetic source detecting means fails to detect a magnetic source, then said azimuth deviation or said lateral deviation of the motor vehicle with respect to said running path is calculated based on lateral deviations of respective two magnetic sources which are detected successively by the other of said magnetic source detecting means.

5. A method according to claim 4, further comprising the steps of:

providing distance detecting means for detecting a traveled distance of the motor vehicle;

calculating an angle between a traveled direction in which the motor vehicle travels and said running path according to a predetermined equation from the lateral deviations of said respective two magnetic sources which are detected successively by the other of said magnetic source detecting means, and a traveled distance of the motor vehicle which is detected by said distance detecting means between times when the magnetic sources are detected successively; and determining said angle as said azimuth deviation.

6. A method according to claim 5, wherein said lateral deviation of said motor vehicle comprises a lateral deviation of a center of the motor vehicle with respect to said running path, and is calculated according to a predetermined equation depending on a geometric positional relationship between the center of the motor vehicle and the other of said magnetic source detecting means, from said azimuth deviation and one of the lateral deviations of said respective two magnetic sources.

7. A method according to claim 4, further comprising the steps of:

providing distance detecting means for detecting a traveled distance of the motor vehicle;

calculating a lateral deviation of a center of the motor vehicle with respect to said running path according to a predetermined equation depending on a geometric positional relationship between the center of the motor vehicle and the other of said magnetic source detecting means, from the lateral deviations of said respective two magnetic sources which are detected successively by the other of said magnetic source detecting means, and a traveled distance of the motor vehicle which is detected by said distance detecting means between times when the magnetic sources are detected successively; and determining the calculated lateral deviation as the lateral deviation of said motor vehicle.

8. A method of calculating a positional relationship, with respect to a running path on a road, of a motor vehicle which is automatically steered to run along the running path while detecting magnetic sources that are arranged on the road at spaced intervals along the running path, comprising the steps of:

providing a pair of magnetic source detecting means on respective front and rear portions of the motor vehicle, for detecting lateral deviations of magnetic sources with respect to the motor vehicle at the respective front and rear portions thereof;

providing timer means for recognizing times at which magnetic sources are detected respectively by said magnetic source detecting means; and calculating an azimuth deviation or a lateral deviation of the motor vehicle with respect to the running path based on lateral deviations of the magnetic sources which are detected by said magnetic source detecting means, respectively, and a chronological relationship between said times at which the magnetic sources are detected by said magnetic source detecting means, respectively.

9. A method according to claim 8, wherein said azimuth deviation of said motor vehicle comprises an angle formed between a traveled direction in which the motor vehicle travels and said running path, and is calculated, if the times at which the magnetic sources are detected respectively by said magnetic source detecting means are substantially the same as each other, according to a predetermined equation from the lateral deviations of the magnetic sources which are detected by said magnetic source detecting means, respectively, and either the interval between the magnetic sources which are detected substantially simultaneously by said magnetic source detecting means, respectively, or the distance between said magnetic source detecting means.

10. A method according to claim 8, wherein said lateral deviation of said motor vehicle comprises a lateral deviation of a center of the motor vehicle with respect to said running path, and is calculated, if the times at which the magnetic sources are detected respectively by said magnetic source detecting means are substantially the same as each other, according to a predetermined equation depending on a geometric positional relationship between the center of the motor vehicle and said magnetic source detecting means, from the lateral deviations of the magnetic sources which are detected by said magnetic source detecting means, respectively.

11. A method according to claim 8, wherein said azimuth deviation of said motor vehicle comprises an angle formed between a traveled direction in which the motor vehicle travels and said running path, and is calculated, if the times at which the magnetic sources are detected respectively by said magnetic source detecting means are different from each other, according to a predetermined equation from the interval between the magnetic sources which are detected successively by the magnetic source detecting means, determined depending on whether the time at which the magnetic source detecting means on the front portion of the motor vehicle detects a magnetic source is earlier or later than the time at which the magnetic source detecting means on the rear portion of the motor vehicle detects a magnetic source, and the lateral deviations of the magnetic sources which are detected by said magnetic source detecting means, respectively.

12. A method according to claim 11, wherein said lateral deviation of said motor vehicle comprises a lateral deviation of a center of the motor vehicle with respect to said running path, and is calculated according to a predetermined equation depending on a geometric positional relationship between the center of the motor vehicle and said magnetic source detecting means and the chronological relationship between said times at which the magnetic sources are detected by said magnetic source detecting means, respectively, from the lateral deviations of the magnetic sources which are detected by said magnetic source detecting means, respectively, the interval between the magnetic sources which are detected successively by said magnetic source detecting means, respectively, and said azimuth deviation.

13. A method according to claim 8, wherein if one of said magnetic source detecting means fails to detect a magnetic source, then said azimuth deviation or said lateral deviation of the motor vehicle with respect to said running path is calculated based on lateral deviations of respective two magnetic sources which are detected successively by the other of said magnetic source detecting means.

14. A method according to claim 13, further comprising the steps of:

providing distance detecting means for detecting a traveled distance of the motor vehicle;

calculating an angle between a traveled direction in which the motor vehicle travels and said running path according to a predetermined equation from the lateral deviations of said respective two magnetic sources which are detected successively by the other of said magnetic source detecting means, and a traveled distance of the motor vehicle which is detected by said distance detecting means between times when the magnetic sources are detected successively; and determining said angle as said azimuth deviation.

15. A method according to claim 14, wherein said lateral deviation of said motor vehicle comprises a lateral deviation of a center of the motor vehicle with respect to said running path, and is calculated according to a predetermined equation depending on a geometric positional relationship between the center of the motor vehicle and the other of said magnetic source detecting means, from said azimuth deviation and one of the lateral deviations of said respective two magnetic sources.

16. A method according to claim 13, further comprising the steps of:

providing distance detecting means for detecting a traveled distance of the motor vehicle;

calculating a lateral deviation of a center of the motor vehicle with respect to said running path according to a predetermined equation depending on a geometric positional relationship between the center of the motor vehicle and the other of said magnetic source detecting means, from the lateral deviations of said respective two magnetic sources which are detected successively by the other of said magnetic source detecting means, and a traveled distance of the motor vehicle which is detected by said distance detecting means between times when the magnetic sources are detected successively; and determining the calculated lateral deviation as the lateral deviation of said motor vehicle.

17. A method of calculating a positional relationship, with respect to a running path on a road, of a motor vehicle which is automatically steered to run along the running path while detecting magnetic sources that are arranged on the road at spaced intervals along the running path, comprising the steps of:

providing a pair of magnetic source detecting means on respective front and rear portions of the motor vehicle, for detecting lateral deviations of magnetic sources with respect to the motor vehicle at the respective front and rear portions thereof;

providing distance detecting means for detecting a traveled distance of the motor vehicle when magnetic sources are detected respectively by said magnetic source detecting means;

recognizing respective positions of the magnetic source detecting means along the traveled distance on the running path when the magnetic sources are detected by said magnetic source detecting means, based on the traveled distance and positions of the magnetic sources with respect to the motor vehicle; and calculating an azimuth deviation or a lateral deviation of the motor vehicle with respect to the running path based on lateral deviations of the magnetic sources which are detected by said magnetic source detecting means, respectively, and a magnitude of a distance between the positions on the running path of the respective magnetic source detecting means when the magnetic sources are detected by said magnetic source detecting means.

18. A method according to claim 17, wherein said azimuth deviation of said motor vehicle comprises an angle formed between a traveled direction in which the motor vehicle travels and said running path, and is calculated, if the distance difference is substantially equal to the distance between the magnetic source detecting means, according to a predetermined equation from the lateral deviations of the magnetic sources which are detected by said magnetic source detecting means, respectively, and either the interval between the magnetic sources which are detected by said magnetic source detecting means, respectively, or the distance between said magnetic source detecting means.

19. A method according to claim 17, wherein said lateral deviation of said motor vehicle comprises a lateral deviation of a center of the motor vehicle with respect to said running path, and is calculated, if the distance difference is substantially equal to the distance between the magnetic source detecting means, according to a predetermined equation depending on a geometric positional relationship between the center of the motor vehicle and said magnetic source detecting means, from the lateral deviations of the magnetic sources which are detected by said magnetic source detecting means, respectively.

20. A method according to claim 17, wherein said azimuth deviation of said motor vehicle comprises an angle formed between a traveled direction in which the motor vehicle travels and said running path, and is calculated, if the distance difference is different from the distance between the magnetic source detecting means, according to a predetermined equation from the interval between the magnetic sources which are detected successively by the magnetic source detecting means, determined depending on whether said distance difference is greater or smaller than the distance between the magnetic source detecting means, and the lateral deviations of the magnetic sources which are detected by said magnetic source detecting means, respectively.

21. A method according to claim 20, wherein said lateral deviation of said motor vehicle comprises a lateral deviation of a center of the motor vehicle with respect to said running path, and is calculated, if the distance difference is different from the distance between the magnetic source detecting means, according to a predetermined equation depending on a geometric positional relationship between the center of the motor vehicle and said magnetic source detecting means and the magnitude relationship of the distance difference to the distance between the magnetic source detecting means, from the lateral deviations of the magnetic sources which are detected by said magnetic source detecting means, respectively, the interval between the magnetic sources which are detected successively by said magnetic source detecting means, respectively, and said azimuth deviation.

22. A method according to claim 17, wherein if one of said magnetic source detecting means fails to detect a magnetic source, then said azimuth deviation or said lateral deviation of the motor vehicle with respect to said running path is calculated based on lateral deviations of respective two magnetic sources which are detected successively by the other of said magnetic source detecting means.

23. A method according to claim 22, further comprising the steps of:

calculating an angle between a traveled direction in which the motor vehicle travels and said running path according to a predetermined equation from the lateral deviations of respective two magnetic sources which are detected successively by the other of said magnetic source detecting means, and a traveled distance of the motor vehicle between times at which the respective two magnetic sources are detected successively; and determining the calculated angle as said azimuth angle.

24. A method according to claim 23, wherein said lateral deviation of said motor vehicle comprises a lateral deviation of a center of the motor vehicle with respect to said running path, and is calculated according to a predetermined equation depending on a geometric positional relationship between the center of the motor vehicle and the other of said magnetic source detecting means from said azimuth angle and one of the lateral deviations of said respective two magnetic sources.

25. A method according to claim 22, further comprising the steps of:

calculating a lateral deviation of a center of the motor vehicle with respect to said running path according to a predetermined equation a geometric positional relationship between the center of the motor vehicle and the other of said magnetic source detecting means from the lateral deviations of respective two magnetic sources which are detected successively by the other of said magnetic source detecting means, and a traveled distance of the motor vehicle between times at which the respective two magnetic sources are detected successively; and determining the calculated lateral deviation as said lateral deviation of the motor vehicle.

26. A method of calculating a positional relationship, with respect to a running path on a road, of a motor vehicle which is automatically steered to run along the running path while detecting magnetic sources that are arranged on the road at spaced intervals along the running path, comprising the steps of:

providing a pair of magnetic source detecting means on respective front and rear portions of the motor vehicle, for detecting lateral deviations of magnetic sources with respect to the motor vehicle at the respective front and rear portions thereof;

providing distance detecting means for detecting a traveled distance of the motor vehicle when magnetic sources are detected respectively by said magnetic source detecting means;

recognizing respective positions of the magnetic source detecting means along the traveled distance on the running path when the magnetic sources are detected by said magnetic source detecting means, based on the traveled distance and positions of the magnetic sources with respect to the motor vehicle; and calculating an azimuth deviation or a lateral deviation of the motor vehicle with respect to the running path based on lateral deviations of the magnetic sources which are detected by said magnetic source detecting means, respectively, and a distance difference between the positions on the running path of the respective magnetic source detecting means when the magnetic sources are detected by said magnetic source detecting means.

27. A method according to claim 26, wherein said azimuth deviation of said motor vehicle comprises an angle formed between a traveled direction in which the motor vehicle travels and said running path, and is calculated according to a predetermined equation from the lateral deviations of the magnetic sources which are detected by said magnetic source detecting means, respectively, and said distance difference.

28. A method according to claim 26, wherein said lateral deviation of said motor vehicle comprises a lateral deviation of a center of the motor vehicle with respect to said running path, and is calculated, if the distance difference is substantially equal to the distance between the magnetic source detecting means, according to a predetermined equation depending on a geometric positional relationship between the center of the motor vehicle and said magnetic source detecting means, from the lateral deviations of the magnetic sources which are detected by said magnetic source detecting means, respectively.

29. A method according to claim 26, wherein said lateral deviation of said motor vehicle comprises a lateral deviation of a center of the motor vehicle with respect to said running path, and is calculated, if the distance difference is different from the distance between the magnetic source detecting means, according to a predetermined equation depending on a geometric positional relationship between the center of the motor vehicle and said magnetic source detecting means and a magnitude relationship of the distance difference to the distance between the magnetic source detecting means, from the lateral deviations of the magnetic sources which are detected by said magnetic source detecting means, respectively, and said distance difference.

30. A method according to claim 26, wherein if one of said magnetic source detecting means fails to detect a magnetic source, then said azimuth deviation or said lateral deviation of the motor vehicle with respect to said running path is calculated based on lateral deviations of respective two magnetic sources which are detected successively by the other of said magnetic source detecting means.

31. A method according to claim 30, further comprising the steps of:

calculating an angle between a traveled direction in which the motor vehicle travels and said running path according to a predetermined equation from the lateral deviations of respective two magnetic sources which are detected successively by the other of said magnetic source detecting means, and a traveled distance of the motor vehicle between times at which the respective two magnetic sources are detected successively; and determining the calculated angle as said azimuth angle.

32. A method according to claim 31, wherein said lateral deviation of said motor vehicle comprises a lateral deviation of a center of the motor vehicle with respect to said running path, and is calculated according to a predetermined equation depending on a geometric positional relationship between the center of the motor vehicle and the other of said magnetic source detecting means from said azimuth angle and one of the lateral deviations of said respective two magnetic sources.

33. A method according to claim 30, further comprising the steps of:

calculating a lateral deviation of a center of the motor vehicle with respect to said running path according to a predetermined equation a geometric positional relationship between the center of the motor vehicle and the other of said magnetic source detecting means from the lateral deviations of respective two magnetic sources which are detected successively by the other of said magnetic source detecting means, and a traveled distance of the motor vehicle between times at which the respective two magnetic sources are detected successively; and determining the calculated lateral deviation as said lateral deviation of the motor vehicle.

34. A method of calculating a positional relationship, with respect to a running paths on a road, of a motor vehicle which is automatically steered to run along the running path while detecting magnetic sources that are arranged on the road at spaced intervals along the running path, comprising the steps of:

providing a pair of magnetic source detectors on respective front and rear portions of the motor vehicle, for detecting lateral deviations of magnetic sources with respect to the motor vehicle at the respective front and rear portions thereof, said magnetic source detectors being spaced from each other by a distance which is substantially an integral multiple of the interval between adjacent two of the magnetic sources; and calculating an azimuth deviation or a lateral deviation of the motor vehicle with respect to the running path based on lateral deviations of the magnetic sources which are detected substantially simultaneously by said magnetic source detectors, respectively.

* * * * *